(12) United States Patent
Bloomstein et al.

(10) Patent No.: US 9,319,265 B2
(45) Date of Patent: Apr. 19, 2016

(54) READ AHEAD CACHING OF DATA FROM CLOUD STORAGE AND METHOD THEREOF

(71) Applicant: BlueArc UK Limited, Berkshire (GB)

(72) Inventors: Jason R. Bloomstein, Mountain View, CA (US); Joseph Meadows, Ashland, OR (US); Inna Bort-Shatsky, Castro Valley, CA (US)

(73) Assignee: Hitachi Data Systems Engineering UK Limited, Berkshire (GB)

( * ) Notice: Subject to any disclaimer, the term of this patent is extended or adjusted under 35 U.S.C. 154(b) by 290 days.

(21) Appl. No.: 13/774,800

(22) Filed: Feb. 22, 2013

(65) Prior Publication Data

US 2014/0244937 A1    Aug. 28, 2014

(51) Int. Cl.
*G06F 12/12* (2006.01)
*H04L 29/08* (2006.01)
*G06F 17/30* (2006.01)

(52) U.S. Cl.
CPC .... *H04L 29/08801* (2013.01); *G06F 17/30156* (2013.01); *G06F 17/30194* (2013.01); *H04L 67/1097* (2013.01)

(58) Field of Classification Search
None
See application file for complete search history.

(56) References Cited

U.S. PATENT DOCUMENTS

| 8,156,281 B1 * | 4/2012 | Grosner et al. | 711/114 |
| 2007/0050548 A1 * | 3/2007 | Bali et al. | 711/118 |
| 2009/0055582 A1 * | 2/2009 | Bish et al. | 711/111 |
| 2013/0110790 A1 * | 5/2013 | Matsumoto et al. | 707/679 |

* cited by examiner

*Primary Examiner* — Reginald Bragdon
*Assistant Examiner* — Edward Wang
(74) *Attorney, Agent, or Firm* — Mattingly & Malur, PC

(57) ABSTRACT

A high tier storage area stores a stub file and a lower tier cloud storage area stores the file corresponding to the stub file. When a client apparatus requests segments of the file from the high tier storage area, reference is made to the stub file to determine a predicted non-sequential pattern of requests to the segments by the client apparatus. The high tier storage area follows the predicted non-sequential pattern of requests to retrieve the segments of the file from the cloud prior to the client apparatus actually requesting the segments. As such, the file may be efficiently provided to the client apparatus while also efficiently storing the file on the lower tier cloud storage area.

22 Claims, 18 Drawing Sheets

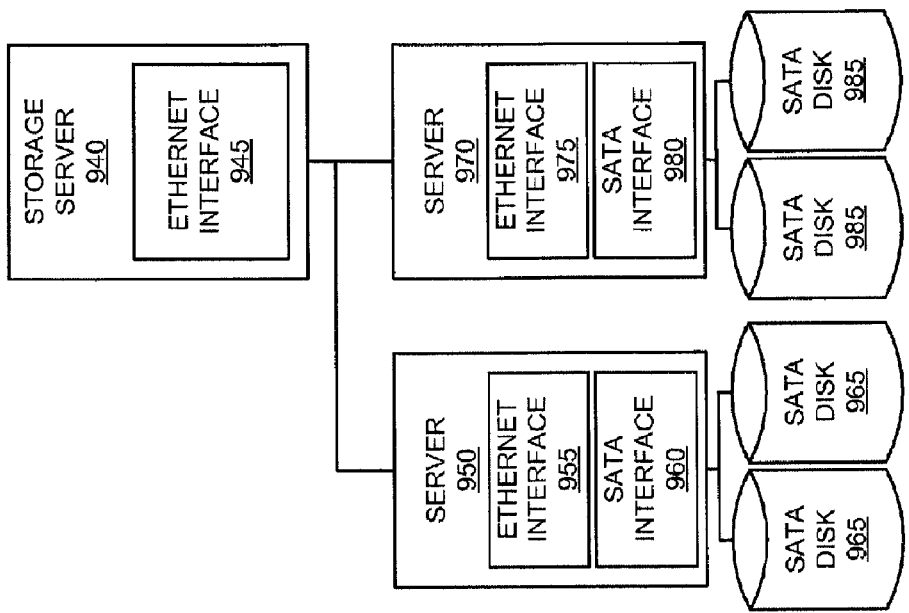
FIG. 9C
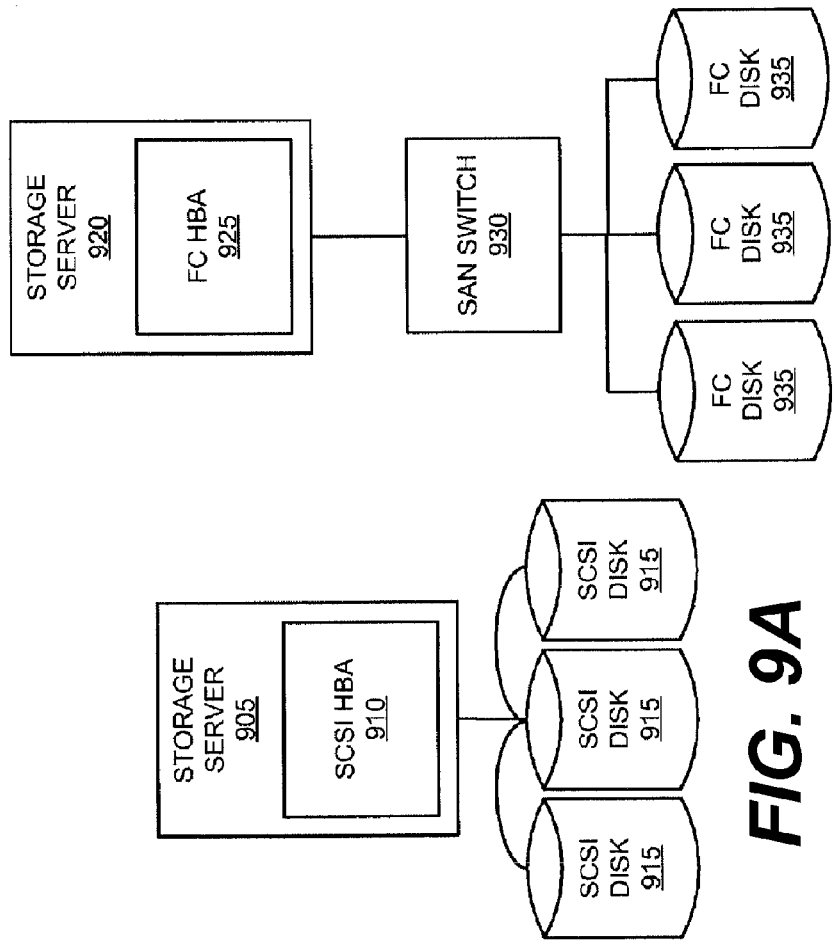
FIG. 9B
FIG. 9A

MANAGEMENT TABLE ← 8113

| FILE | STUB | TYPE | LOCATION | ACCESS TIME | SIZE | STATUS |
|---|---|---|---|---|---|---|
| 1 | YES | WORD | LDEV1/... | MM/DD/YYYY | 2MB | MIGRATED |
| 2 | YES | POWER POINT | LDEV2/... | MM/DD/YYYY | 0.5MB | UNDER MIGRATION |
| 3 | NO | WORD | LDEV1/... | MM/DD/YYYY | 1MB | LOCAL |
| 4 | NO | POWER POINT | LDEV1/... | MM/DD/YYYY | 2MB | LOCAL |
| 5 | NO | WORD | LDEV2/... | MM/DD/YYYY | 3MB | LOCAL |
| ↓ | ↓ | ↓ | ↓ | ↓ | ↓ | ↓ |
| N | NO | WORD | LDEV2/... | MM/DD/YYYY | 1MB | LOCAL |

*FIG. 13*

| REQUEST # | SEGMENT # |
|---|---|
| 1 | 0 |
| 2 | 0 |
| 3 | 0 |
| 4 | END |
| 5 | 0 |
| 6 | 2 |
| 7 | 3 |
| 8 | 1 |
| 9 | N + 1 |
| 10 | N |
| 11 | N + 3 |
| 12 | N + 2 |
| 13 | N + 5 |
| 14 | N + 4 |
| . . . | . . . |
| X | END |

Rows 9–X: INTERLEAVING

*FIG. 15*

| REQUEST # | SEGMENT # |
|---|---|
| 1 | 0 |
| 2 | 0 |
| 3 | 0 |
| 4 | 1 |
| 5 | 2 |
| 6 | 3 |
| 7 | 4 |
| 8 | 5 |
| 9 | 6 |
| 10 | END |
| 11 | 0 |
| 12 | 0 |
| 13 | END |

*FIG. 20*

| REQUEST # | SEGMENT # |
|---|---|
| 1 | 0 |
| 2 | 0 |
| 3 | 0 |
| 4 | 1 |
| 5 | 2 |
| 6 | 3 |
| 7 | 4 |
| 8 | END |
| 9 | 0 |

*FIG. 21*

READ AHEAD CACHING OF DATA FROM CLOUD STORAGE AND METHOD THEREOF

FIELD OF THE INVENTION

The present invention relates generally to file storage on computer devices, and more particularly to file storage and access between tiered storage systems.

BACKGROUND OF THE INVENTION

Conventional methods exist for accessing files stored on a network-connected storage system which offers tiered storage areas. One conventional method of file system access (I/O) is disclosed in Palevich, et al. (U.S. Pat. No. 7,441,012). Palevich, et al. discloses a file system that combines efficient caching and buffering to provide a network file system that utilizes data in one or more compressed image files of sequentially arranged byte stream data. Thus, in Palevich, et al., an application requests "file opens" and "file reads" of a file system in a normal manner, and the location of the file information is determined. From the location information, a set of block data (e.g., starting block and number thereof) is specified (e.g., an I/O request) in order to obtain the data. The block data is converted by the net block driver into byte size range requests, or the like, in order to retrieve the data from a remote server in block multiples. By detecting a pattern of sequential block accesses, and using the pattern to request additional byte size range data in anticipation of future block requests, Palevich, et al. increases efficiency by increasing the amount of data requested per Hypertext Transfer Protocol (HTTP) request. Local caching of received data further increases efficiency.

In conventional methods, such as Palevich, et al., the increases in I/O efficiency are based upon increasing the amount of sequential data requested in each HTTP request and the assumption that future I/O requests will be directed to sequential data. Thus, as can be seen in Palevich, et al., merely reading additional data blocks in sequence will not increase the efficiency when the I/O requests are non-sequential.

Therefore, a need exists for handling I/O requests efficiently when the I/O requests are non-sequential. In addition, a further need exists for handling non-sequential I/O requests in consideration of storage options which have recently become available such as cloud storage.

SUMMARY OF THE INVENTION

With the growing popularity of the Internet and web services, "cloud computing" services and applications have grown in popularity. Cloud computing is an alternative to having local servers or personal computing devices handling computing tasks. In general, cloud computing refers to the functionality or storage which comes from the cloud. The term "cloud" is understood to be related to a computer network often assumed to be the Internet, such that the function or storage capability within the cloud computing environment does not come from a specific identifiable device.

In the context of cloud storage, the cloud provides networked data storage where data may be typically stored on third-party servers which may be interconnected and may employ virtualization. In general, cloud computing may represent a subset of grid computing that may include utility computing, and other approaches, for the use of shared computing resources. For example, cloud storage as a service is offered commercially by many vendors as a "public" cloud such as "Amazon S3" (e.g., a remotely hosted cloud) and as a "private" cloud such as "Hitachi Content Platform" (HCP) (e.g., a locally hosted cloud). With cloud storage, access to data stored on the cloud computing environment is directed to the cloud in general and not to any specifically identifiable device using a suitable protocol such as Hypertext Transfer Protocol Secure (HTTPS), as an example. Generally, access to data stored on the cloud is priced according to various data usage metrics. Thus, for example, cloud storage service may be priced on the basis of capacity used, number of accesses (per-access), or I/O volume, etc.

Moreover, as the personal computer continues to serve as a platform for creating, editing and sharing files using office productivity software, the file types associated with documents, presentations, spreadsheets, databases, charts and graphs, create digital paintings, electronic music, make digital movies, etc., have naturally increased in number and size with time. One example of such office productivity software is the MICROSOFT OFFICE application suite (e.g. WORD, EXCEL and POWERPOINT). One such consequence is the proliferation of files which have a limited lifespan of usefulness to users. For example, a file may be created with a suitable word processing application and the file may only have immediate value to users for a short period of time, such as a few or several days. While the user may not wish to permanently delete such a file, if many such files are created, over time these files may begin to clutter the storage area available to a user. Accordingly, there exists a need to provide efficient storage of files which are not of immediate relevance while also maintaining the availability of those files to users. Thus, one object of the present invention is to provide efficient storage of files which are no longer frequently requested by client apparatuses or applications executed thereon.

Further, the present inventors have found that certain popular file types are requested in a non-sequential manner by their corresponding application. For example, a file associated with a particular application may be requested by a client apparatus/application such that a first segment of the file is initially requested, the last segment of the file is requested secondly, and additional requests are then made to intermediate portions of the file. By logging and studying the access patterns of requests for popular file types, the present inventors were able to determine specific access patterns for these file types. An exemplary access pattern may include chronological requests to the first segment of a file, the last segment of a file and then to seemingly random intermediate segments of the file. Further, the specific access patterns may be structured so that repeated requests to the first and last segments are made several times at apparently random intervals. Thus, it is an additional object of the present invention to provide efficient recall of files which are no longer frequently requested in view of the non-sequential access patterns associated with the files.

In a tiered storage system, a high tier storage area may provide a client apparatus computer with higher performance and/or higher cost file storage, while a lower tier storage area may provide a client apparatus computer with lower performance and/or lower cost storage. By providing both high tier and lower tier storage options to a client apparatus computer, the storage of files in the storage system can be arranged such that files that require the high performance capabilities offered by the high tier can be located therein, while files that do not require the high performance capabilities provided by the high tier can be stored in a lower tier. As a result, efficient utilization of storage space can be achieved by moving files which are no longer required to be stored in a high tier storage area to a lower tier storage area. Thus, another object of the present invention is to provide efficient storage of files which are no longer frequently requested by client apparatuses by moving such files from high tier storage to lower tier storage.

The specific sizes of the requested regions and proximity to one another within the file which make up the access pattern are dictated by the particular application and/or file type. Thus, some applications request various sized regions of a file in non-sequential order, and may make one or more redundant requests to the same region of a file.

A first storage apparatus, utilized as a high tier storage area such as Network Attached Storage (NAS), for example, is available to a client apparatus computer, and a second storage apparatus, utilized as a lower tier storage area, is available as cloud-based storage to the first storage apparatus in order to provide efficient storage of files. For example, files stored in the high tier storage area which are not frequently accessed may be more efficiently located for storage in the lower tier storage area to free up storage space in the high tier storage area for other frequently accessed files. Also, one or more files in the high tier storage area may be relocated from the high tier storage area to the lower tier storage area without user intervention. However, metadata associated with the relocated file is stored in the file system of the high tier storage area as a stub file. By maintaining the stub file of the relocated file in the file system of the high tier storage area, the file may still appear to client apparatuses/users as being located in the high tier storage area when the file has actually been relocated to the lower tier storage area. As such, it is another object of the present invention to provide efficient storage and recall of files which have been moved from high tier storage to lower tier storage where the lower tier storage is a cloud storage service and the files are retrieved from the cloud in non-sequential data segments.

As a result, when a file, which has been relocated to the lower tier storage area, is requested to be read, the file system determines the type of file and/or application that the I/O request is directed to by referencing the stub file in the high tier storage system. Based on the type of file specified by the stub file, a non-sequential access pattern associated with the type of file can be referenced by the NAS. Accordingly, the actual file stored in the lower tier storage area (i.e., the cloud) can be accessed according to the determined non-sequential access pattern. Future I/O requests can thus be predicted in accordance with the non-sequential access pattern. As such, the lower tier storage area can be efficiently utilized to store certain files which no longer require high tier storage and the files on the lower tier storage area can be efficiently retrieved upon request by referencing a non-sequential access pattern thereof and caching the retrieved data at the NAS in anticipation that the retrieved data will be requested by a client apparatus.

BRIEF DESCRIPTION OF THE DRAWINGS

FIG. 9A shows a configuration of the first storage apparatus according to an embodiment of the present invention.

FIG. 9B shows a configuration of the first storage apparatus according to an embodiment of the present invention.

FIG. 9C shows a configuration of the first storage apparatus according to an embodiment of the present invention.

FIG. 13 shows an exemplary management table according to an embodiment of the present invention.

FIG. 15 shows a first exemplary access pattern stored in the access pattern database of the first storage apparatus.

FIG. 20 shows a second exemplary access pattern stored in the access pattern database of the first storage apparatus.

FIG. 21 shows a third exemplary access pattern stored in the access pattern database of the first storage apparatus.

DETAILED DESCRIPTION

Figure 1:
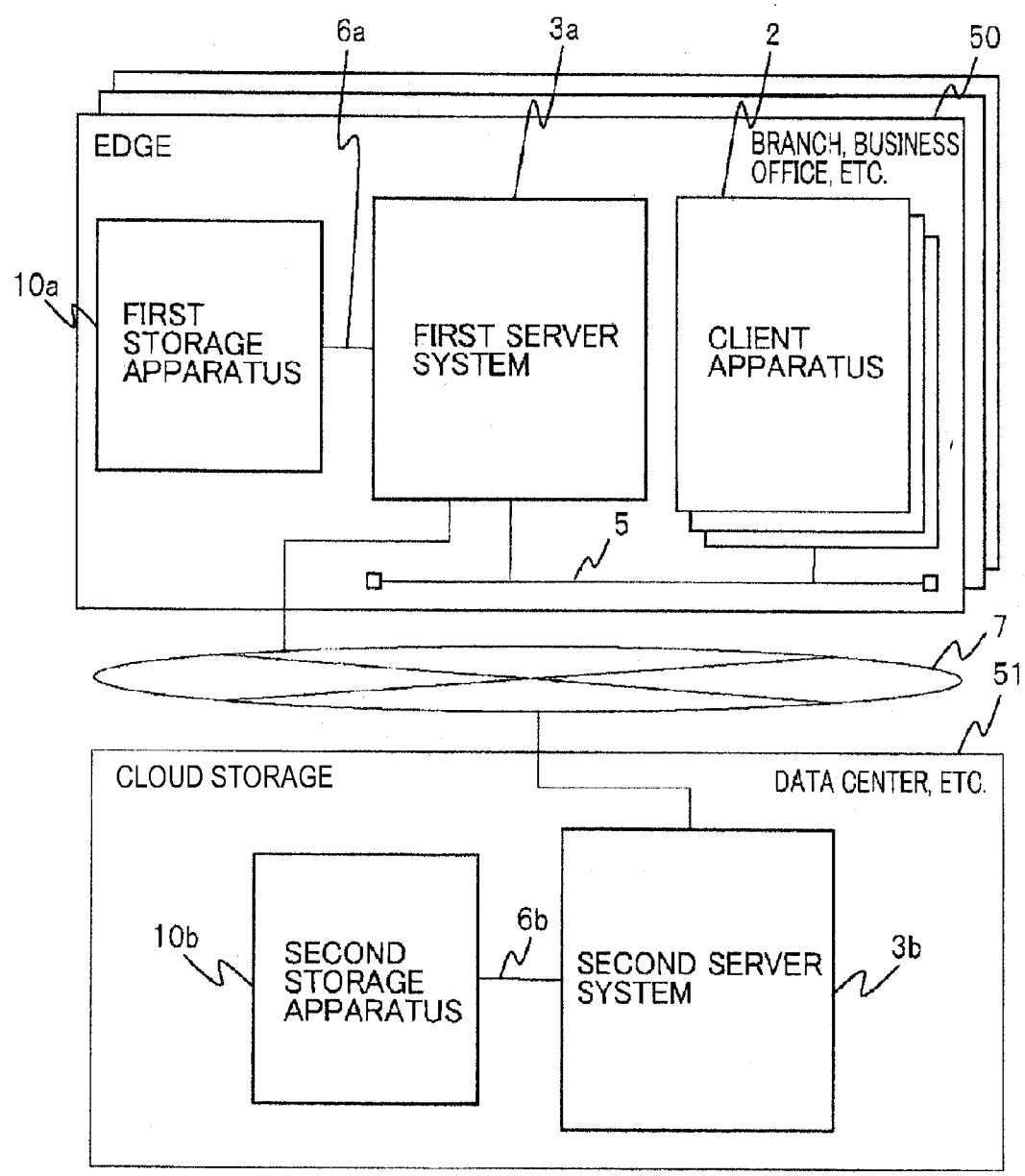
FIG. 1 shows a block diagram of a storage system configuration including a first storage apparatus and a second storage apparatus according to an embodiment of the present invention.

In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals. As such, each of the embodiments described below are exemplary and of a nature such that those skilled in the art will appreciate that the invention may be practiced with other modifications, alternative constructions and equivalents which fall within the spirit and scope of the invention.

FIG. 1 shows a schematic configuration of an exemplary embodiment which is an information processing system that includes hardware which is provided at a place (hereinafter, referred to as an edge 50) where a user actually performs business, such as a branch office, a business office or the like, and hardware which is provided at a place (hereinafter, referred to as a cloud storage 51) such as a data center where an information processing system (application server/storage system, and the like) is managed and provides a cloud storage service to the edge 50.

As shown in FIG. 1, the edge 50 includes a first server system 3a, a first storage apparatus 10a and a client apparatus 2. The cloud storage 51 includes a second server system 3b and a second storage apparatus 10b.

The first server system 3a provided at the edge is, for example, a file storage apparatus including a file system which provides per-file data management function to the client apparatus 2 provided at the edge. The second server system 3b provided at the cloud storage is, for example, an apparatus providing a cloud storage service to the first storage apparatus 10a provided at the edge 50.

As shown in FIG. 1, the client apparatus 2 and the first server system 3a are communicatively coupled via a communication network 5. Also, the first server system 3a and the first storage apparatus 10a are communicatively coupled via a first storage network 6a. Also, the second server system 3b and the second storage apparatus 10b are communicatively coupled via a second storage network 6b. Also, the first server system 3a and the second server system 3b are communicatively coupled via a communication network 7.

The communication network 5 and the communication network 7 are, for example, a LAN (Local Area Network), a WAN (Wide Area Network), the Internet, a public communication network, a private line, and the like. The first storage network 6a and the second storage network 6b are, for example, a LAN, a WAN, a SAN (Storage Area Network), the Internet, a public communication network, a private line, and the like.

Communication via the communication network 5, the communication network 7, the first storage network 6a, or the second storage network 6b is performed in accordance with a protocol such as, for example, TCP/IP, iSCSI (internet Small Computer System Interface), Fibre Channel protocol, FICON (Fibre Connection) (registered trademark), ESCON (Enterprise Systems Connection) (registered trademark), ACONARC (Advanced Connection Architecture) (registered trademark), FIBARC (Fibre Connection Architecture) (registered trademark), and the like.

The client apparatus 2 is an information processing apparatus (e.g., computer) that uses a high tier storage area provided by the first storage apparatus 10a via the first server system 3a, and is, for example, a personal computer, an office computer, or the like. In the client apparatus 2, operating systems such as a file system and a kernel and/or driver that is implemented by software modules, and one or more applications, and the like, are operated.

Figure 2:
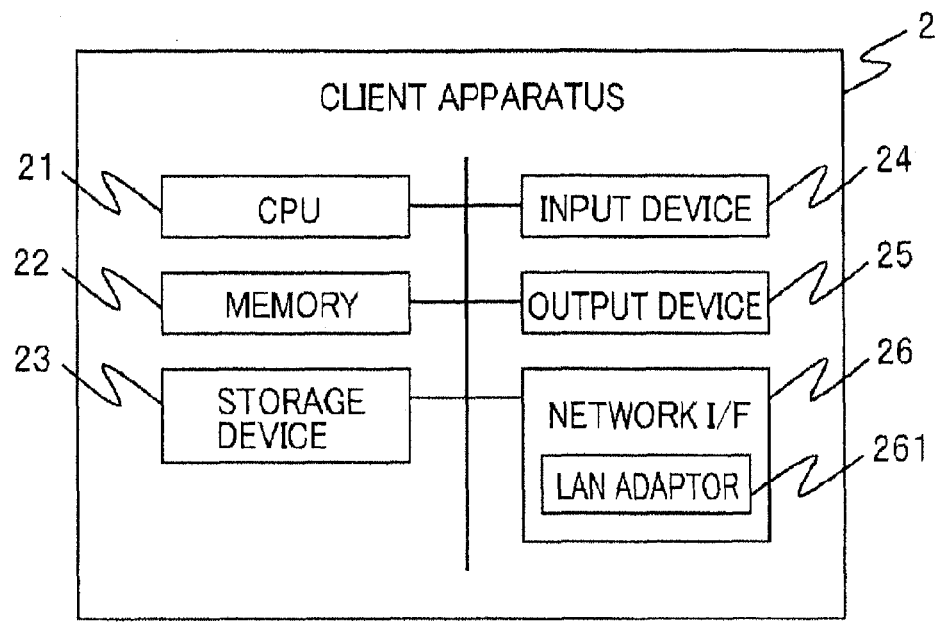
FIG. 2 shows an example of a hardware configuration of a client apparatus according to an embodiment of the present invention.

FIG. 2 shows hardware of the client apparatus 2 (e.g., a client apparatus, user computer, etc.). As illustrated in FIG. 2, the client apparatus 2 includes a CPU 21, a volatile or nonvolatile memory 22 (RAM or ROM), a storage device 23 (e.g., a hard disk drive (HDD), a solid state drive (SSD), etc.), an input device 24 such as a keyboard and a mouse, an output device 25 such as a liquid crystal monitor and a printer, and a network interface (hereinafter, network I/F 26) such as a Network Interface Card (NIC) (hereinafter, LAN adaptor 261).

The first server system 3a is an information apparatus which provides the client apparatus 2 with an information processing service by utilizing a high tier storage area provided by the first storage apparatus 10a. The first server system 3a includes a personal computer, a mainframe, an office computer or the like. When accessing to a high tier storage area provided by the first storage apparatus 10a, the first server system 3a transmits a data frame (hereinafter, abbreviated as a frame) containing the data I/O request (data write request, data read request and the like) to the first storage apparatus 10a via the first storage network 6a. The frame is, for example, a Fibre Channel (FC) frame.

The second server system 3b is an information apparatus which performs information processing by utilizing a storage area provided by the second storage apparatus 10b. The second server system 3b includes a personal computer, a mainframe, an office computer or the like. When accessing to a storage area provided by the second storage apparatus 10b, the second server system 3b transmits a frame containing the data I/O request to the second storage apparatus 10b via the second storage network 6b.

Figure 3:
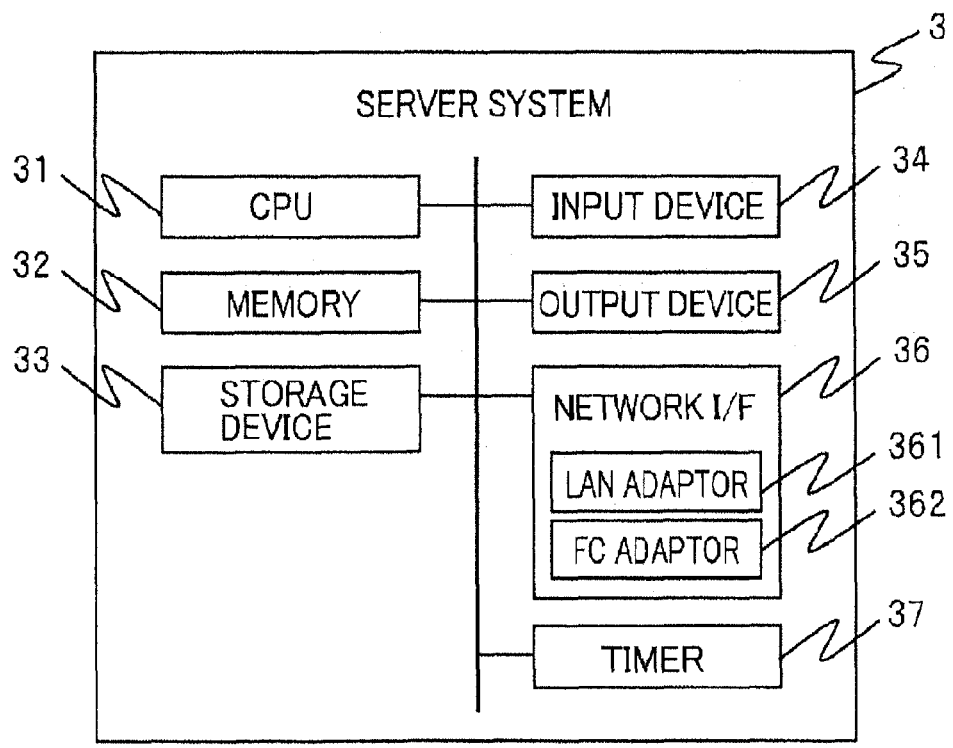
FIG. 3 shows an example of a hardware configuration of a server system according to an embodiment of the present invention.

FIG. 3 shows hardware of the first server system 3a. As illustrated in FIG. 3, the first server system 3a includes a CPU 31, a volatile or nonvolatile memory 32 (RAM or ROM), a storage device 33 (e.g., a HDD, a SSD, etc.), an input device 34 such as a keyboard and a mouse, an output device 35 such as a liquid crystal monitor and/or a printer, a network interface (hereinafter, network I/F 36) such as an NIC (hereinafter, LAN adaptor 361) and a host bus adapter (HBA) (hereinafter, FC adaptor 362), and a timer 37 configured by using a timer circuit, or the like. The second server system 3b existing on the cloud storage side also has the same or similar hardware configuration as the first server system 3a.

Figure 4:
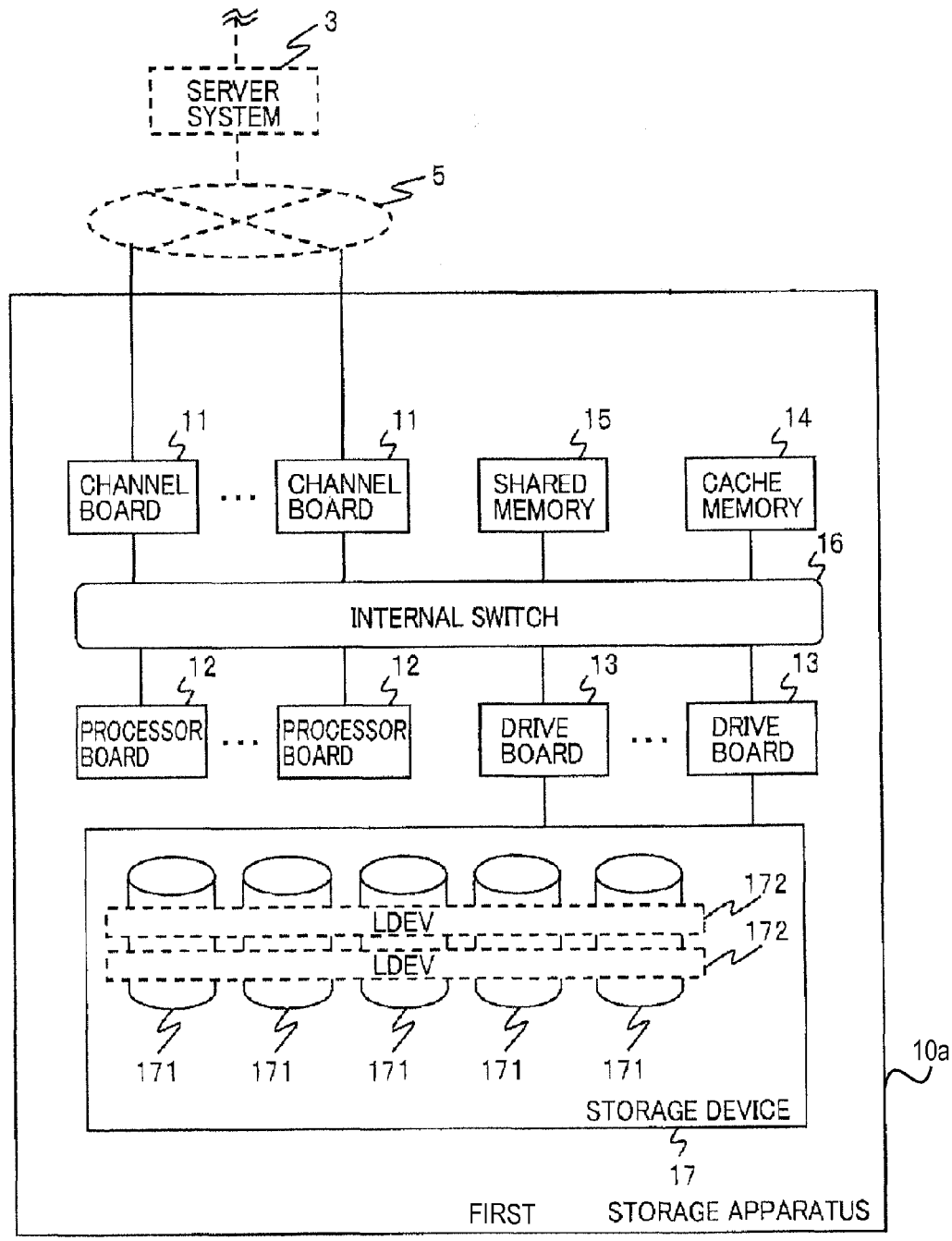
FIG. 4 shows an example of a hardware configuration of a first storage apparatus according to an embodiment of the present invention.

FIG. 4 shows hardware of the first storage apparatus 10a. The first storage apparatus 10a is, for example, a disk array apparatus. The second storage apparatus 10b existing on the cloud storage side may have the same or similar hardware configuration as the first storage apparatus 10a. However, the second storage apparatus 10b existing on the cloud storage side may instead have different hardware configurations from the first storage apparatus 10b as can be appreciated by those skilled in the art. The storage apparatus 10 (e.g., 10a or 10b) receives the data I/O request transmitted from a server system 3 (the first server system 3a or the second server system 3b, the same applies in the following), and in response to the received data I/O request, accesses a storage medium and transmits data as a response to the server system 3.

As shown in FIG. 4, the storage apparatus 10a includes at least one channel board 11, at least one processor board 12 (microprocessor) acting as a controller to control the operation of the storage apparatus 10, at least one drive board 13, a cache memory 14, a shared memory 15, an internal switch 16, a storage device 17, and a processor 122. The channel board 11, the processor board 12, the drive board 13, the cache memory 14 and the shared memory 15 are communicatively coupled to each other via the internal switch 16. The channel board 11 receives a frame transmitted from the server system 3 and sends the server system 3a a frame containing a response of a process (for example, read data, read complete report or write complete report) for the data I/O request contained in the received frame.

The processor board 12 performs, in response to the above-mentioned data I/O request contained in the frame received by the channel board 11, processing of data transfer (high-speed large capacity data transfer using direct memory access (DMA) or the like) among the channel board 11, the drive board 13 and the cache memory 14. The processor board 12 performs transfer (delivery) of data (data read from or to be written into the storage device 17) between the channel board 11 and the drive board 13, and staging (data reading from the storage device 17) and de-staging (data writing to the storage device 17) of the data to be stored in the cache memory 14.

The cache memory 14 is configured using a RAM (Random Access Memory) capable of high-speed access. The cache memory 14 stores therein data to be written to the storage device 17 (hereinafter, referred to as write data), data read from the storage device 17 (hereinafter, referred to as read data), and the like. The shared memory 15 stores therein various kinds of information used for controlling the storage apparatus 10. Alternatively, the storage apparatus 10a can use non-shared memory, local memory, or the like, in place of the shared memory 15.

The drive board 13 performs communication with the storage device 17 when reading data from the storage device 17 or writing data to the storage device 17. The internal switch 16 is configured using, for example, a high-speed cross bar switch. Communication via the internal switch 16 is performed, for example, in accordance with a protocol such as fibre channel, iSCSI, TCP/IP, and the like.

The storage device 17 includes a plurality of storage drives 171. Each storage drive 171 is, for example, a hard disk drive, semiconductor storage device (SSD) or the like of a type such as SAS (Serial Attached SCSI), SATA (Serial ATA), FC (Fibre Channel), PATA (Parallel ATA), and SCSI.

The storage device 17 provides the server system 3 with a storage area of the storage device 17 in units of logical storage areas provided by controlling the storage drives 171 in accordance with a method such as, for example, a RAID (Redundant Arrays of Inexpensive (or Independent) Disks) or the like. The logical storage area is a group of one or more logical devices (LDEV 172, (LDEV: Logical Device)) including, for example, a RAID group (e.g., a parity group).

The storage apparatus 10 provides the server system 3 with a logical storage area (hereinafter, referred to as a Logical Unit or Logical Volume (LU)) configured using the LDEV 172. The storage apparatus 10 manages the correspondence (relation) between the LU and the LDEV 172. Based on the correspondence, the storage apparatus 10 identifies an LDEV 172 corresponding to the LU or identifies an LU corresponding to the LDEV 172.

Figure 5:
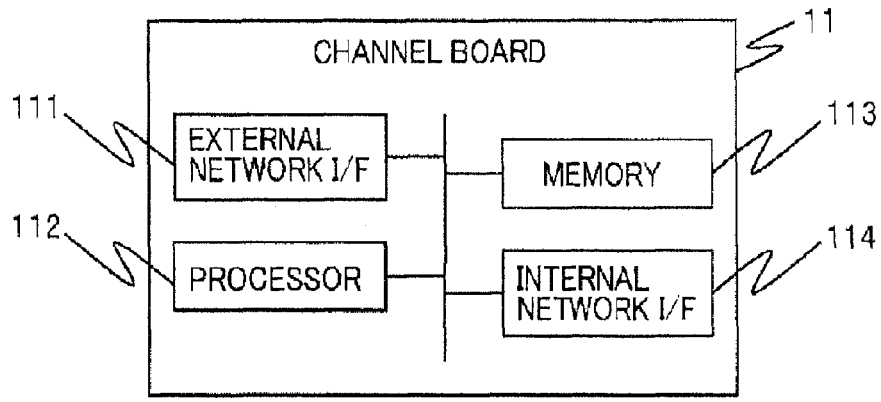
FIG. 5 shows an example of a hardware configuration of a channel board of the first storage apparatus according to an embodiment of the present invention.

FIG. 5 shows a hardware configuration of each of the channel boards 11. As shown in FIG. 5, the channel board 11 includes an external communication interface (hereinafter, referred to as an external network I/F 111) having a port (communication port) for communicating with the server system 3, a processor 112 (including a frame processing chip and a frame transfer chip), a memory 113, and an internal communication interface (hereinafter, referred to as an internal network I/F 114) which includes a port (communication port) for communicating with the processor board 12.

The external network I/F 111 is configured using an NIC (Network Interface Card), an HBA, or the like. The processor 112 is configured using a CPU (Central Processing Unit), a MPU (Micro Processing Unit), and the like. The memory 113 is a RAM (Random Access Memory) or a ROM (Read Only Memory). The memory 113 stores therein micro programs. Various functions provided by the channel board 11 are implemented when the processor 112 reads and executes the above-mentioned micro programs stored in the memory 113. The internal network I/F 114 communicates with the processor board 12, the drive board 13, the cache memory 14, and the shared memory 15 via the internal switch 16.

Figure 6:
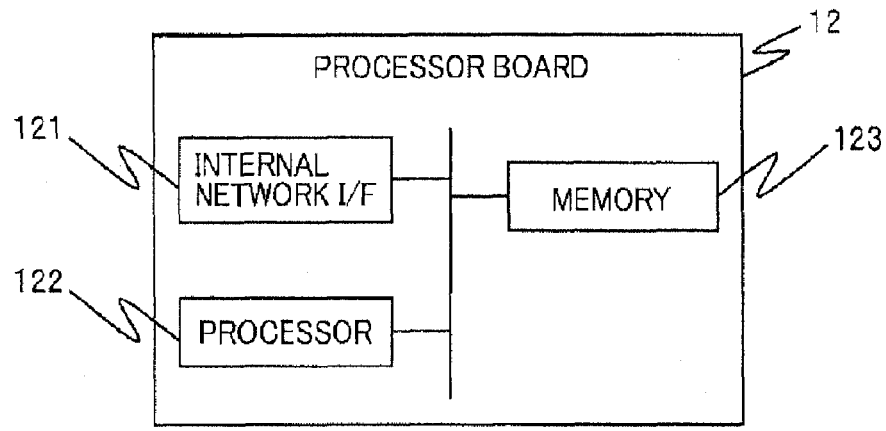
FIG. 6 shows an example of a hardware configuration of a processor board of the first storage apparatus according to an embodiment of the present invention.

FIG. 6 shows a hardware configuration of the processor board 12. The processor board 12 includes an internal network interface (hereinafter, referred to as an internal network I/F 121), a processor 122, and a memory 123 (local memory) of which an access performance from the processor 122 is higher than the shared memory 15 (i.e., high speed access thereto is possible). The memory 123 stores therein micro programs. Various functions provided by the processor board 12 are implemented when the processor 122 reads and executes the micro programs stored in the memory 123.

The internal network 1/F 121 communicates with the channel board 11, the drive board 13, the cache memory 14, and the shared memory 15 via the internal switch 16. The processor 122 is configured using a CPU, an MPU, a DMA (Direct Memory Access), and the like. The memory 123 is a RAM or a ROM. The processor 122 can access both the memory 123 and the shared memory 15.

Figure 7:
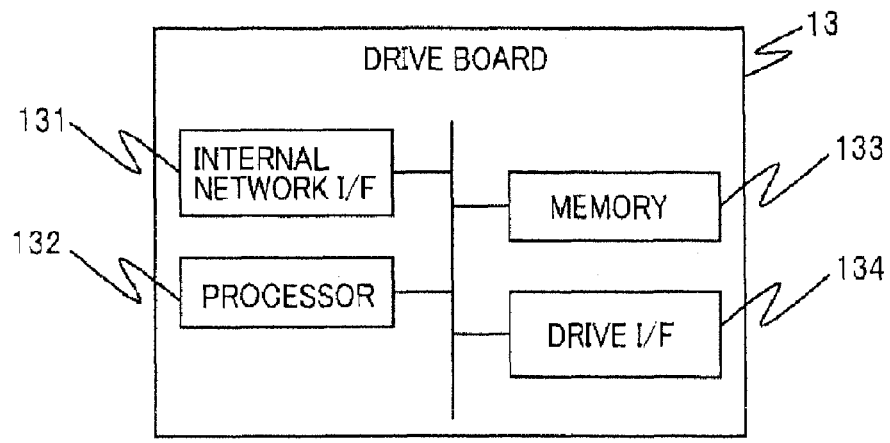
FIG. 7 shows an example of a hardware configuration of a drive board of the first storage apparatus according to an embodiment of the present invention.

FIG. 7 shows a hardware configuration of the drive board 13. The drive board 13 includes an internal network interface (hereinafter, referred to as an internal network I/F 131), a processor 132, a memory 133, and a drive interface (hereinafter, referred to as a drive I/F 134). The memory 133 stores therein microprograms. Various functions provided by the drive board 13 are implemented when the processor 132 reads and executes the microprograms stored in the memory 133. The internal network I/F 131 communicates with the channel board 11, the processor board 12, the cache memory 14, and the shared memory 15 via the internal switch 16. The processor 132 is configured using a CPU, an MPU, and the like. The memory 133 is, for example, a RAM or a ROM. The drive I/F 134 communicates with the storage device 17.

Figure 8:
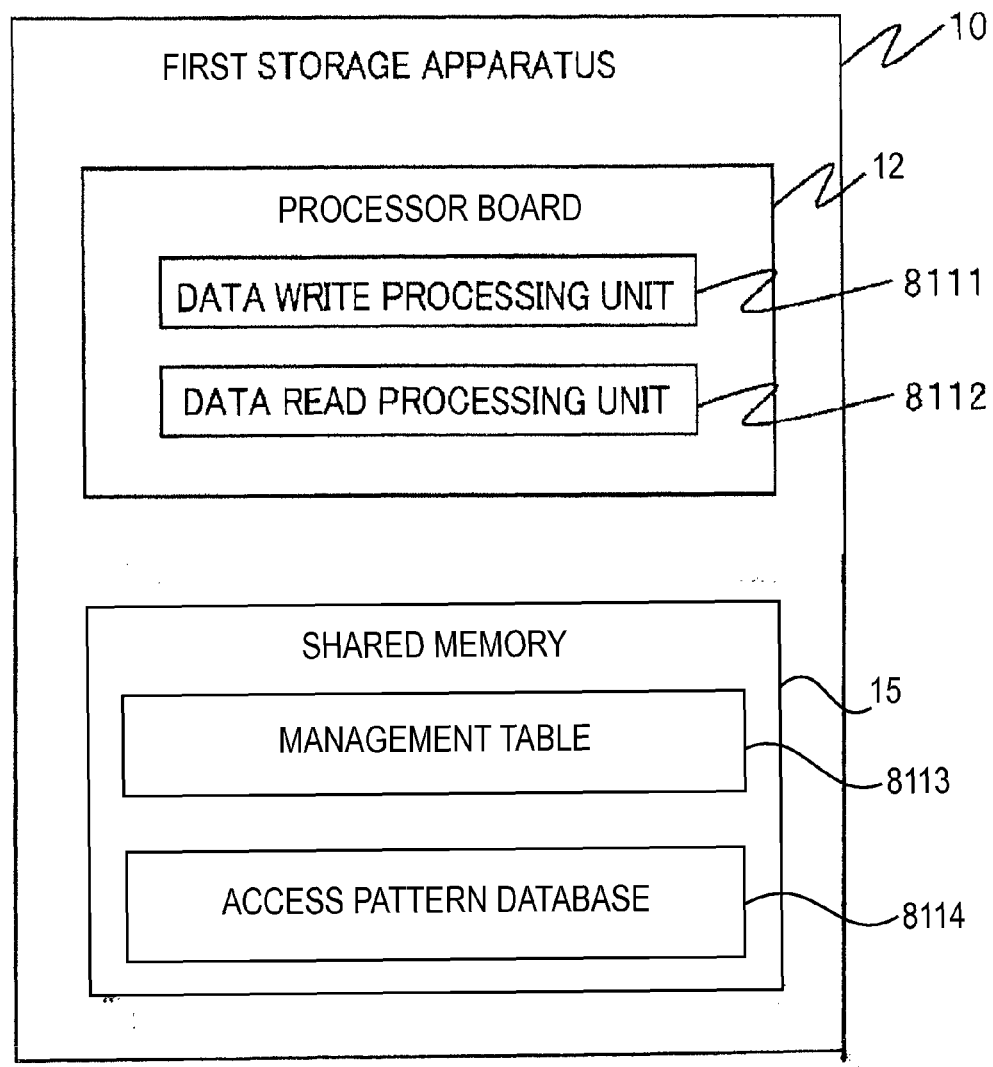
FIG. 8 shows basic functional units of the processor board and details of the shared memory of the first storage apparatus according to an embodiment of the present invention.

FIG. 8 shows basic functions of the storage apparatus 10a. As shown in FIG. 8, the storage apparatus 10a includes an I/O processing unit which may be implemented in the storage apparatus using the processor boards 12 and the shared memory 15. The I/O processing unit 811 includes a data write processing unit 8111 which performs processing relating to writing to the storage device 17, and a data read processing unit 8112 which performs processing relating to reading of data from the storage device 17.

The functions of the I/O processing unit are implemented by hardware included in the channel board 11, the processor board 12 and the drive board 13 of the storage apparatus 10 or when the microprograms stored in the memories 113, 123 and 133 are read and executed by the processors 112, 122 and 132, respectively.

In FIG. 4, the storage apparatus 10 is provided with a storage device 17 which has a plurality of storage drives 171 providing logical devices as storage units to the client apparatus 2. Each storage drive 171 is, for example, a hard disk drive, semiconductor storage device (SSD) or the like of a type such as SAS (Serial Attached SCSI), SATA (Serial ATA), FC (Fibre Channel), PATA (Parallel ATA), and SCSI. FIGS. 9A, 9B and 9C show exemplary configurations of specific disk types.

In FIG. 9A, the storage drives 171 are SCSI disks 915 which interface with the storage apparatus 10 via a SCSI HBA 910 of the storage server 905. In FIG. 9B, the storage drives 171 are FC Disks 935 which interface with the storage apparatus 10 via a FC HBA 925 of the storage server 920 and a SAN switch 930. In FIG. 9C, the storage drives 171 are SATA disks 965 which interface with the storage apparatus 10 via SATA interfaces 960 of servers 950, 970 which respectively communicate via Ethernet interfaces 955, 975 with an Ethernet interface 945 of the storage server 940 of the storage apparatus 10.

Figure 10:
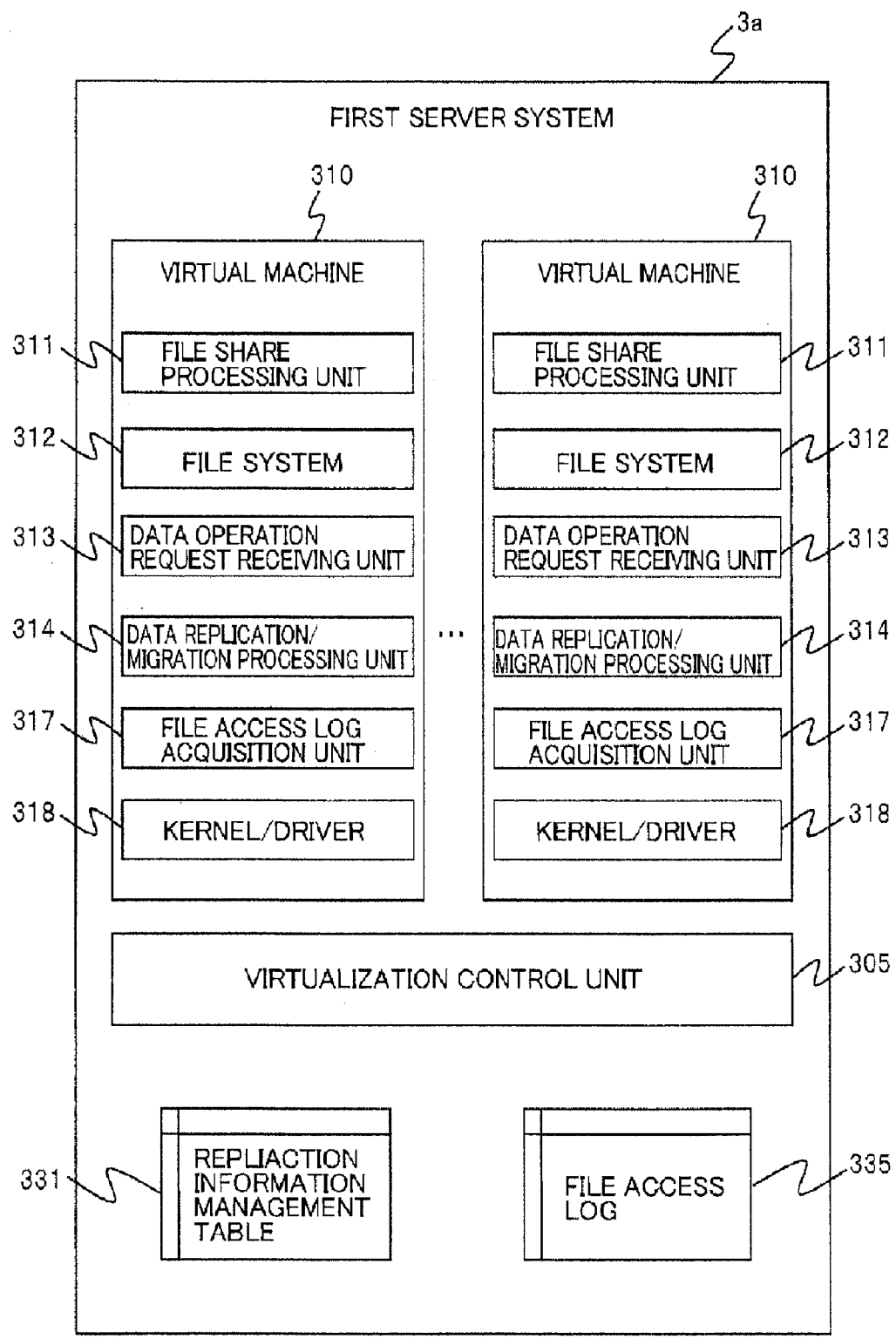
FIG. 10 shows a detailed configuration of the first server system according to an embodiment of the present invention.

FIG. 10 illustrates primary functions of the first server system 3a and primary information (data) managed in the first server system 3a. As shown in FIG. 10, in the first server system 3a, a virtualization control unit 305 providing an virtual environment and at least one virtual machine 310 which operates under the control of the virtualization control unit 305 are implemented.

In each virtual machine 310, functions of a file share processing unit 311, a file system 312, a data operation request receiving unit 313, a data replication/migration processing unit 314, a file access log acquisition unit 317, and a kernel/driver 318 are implemented.

The virtual environment may be achieved by a method of a so-called client apparatus OS type in which the operating system intervenes between hardware of the first server system 3a and the virtualization control unit 305 or a method of a hypervisor type in which the operating system does not intervene between hardware of the first server system 3a and the virtualization control unit 305. Functions of a data operation request receiving unit 313, a data replication/migration processing unit 314 and a file access log acquisition unit 317 may be implemented as functions of the file system 312, or as functions independent from the file system 312.

As shown in FIG. 10, the virtual machines 310 manage information (data) such as a replication information management table 331, a file access log 335, and the like. Such information can be read from the first storage 10a to the first server system 3a and stored in the memory 32 and the storage device 33 of the first server system 3a as needed.

Of the functions illustrated in FIG. 10, the file share processing unit 311 provides the client apparatus 2 with an environment where files can be shared. The file share processing unit 311 provides the functions specified, for example, in the protocol of NFS (Network File System), CIFS (Common Internet File System), AFS (Andrew File System), or the like.

The file system 312 provides the client apparatus 2 with functions related to I/O to and from a file (or a directory) managed by the logical volume (LU) provided by the first storage apparatus 10a. The file system 312 is based for example on an FAT (File Allocation Table), NTFS (New Technology File System), HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, or the like.

Figure 11C:
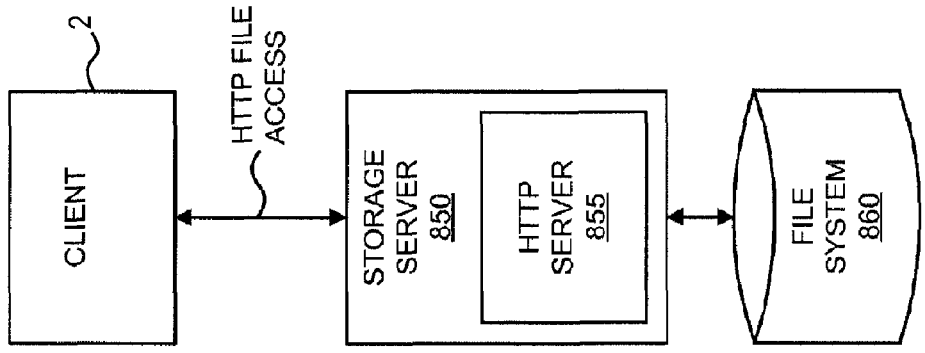
FIG. 11C shows a communications configuration between a client apparatus and a file system according to an embodiment of the present invention.
Figure 11B:
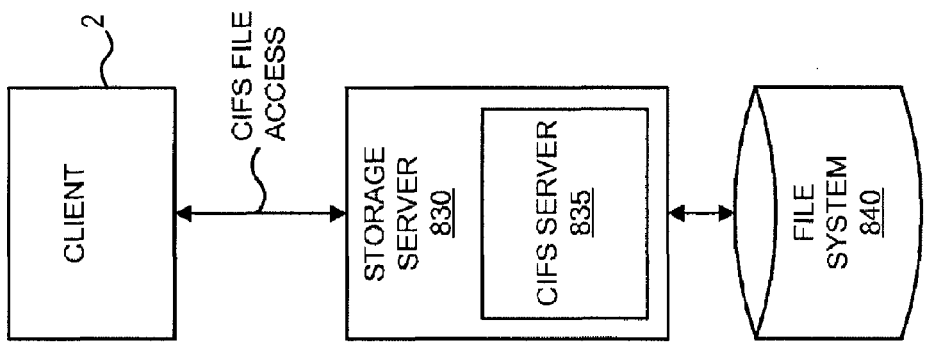
FIG. 11B shows a communications configuration between a client apparatus and a file system according to an embodiment of the present invention.
Figure 11A:
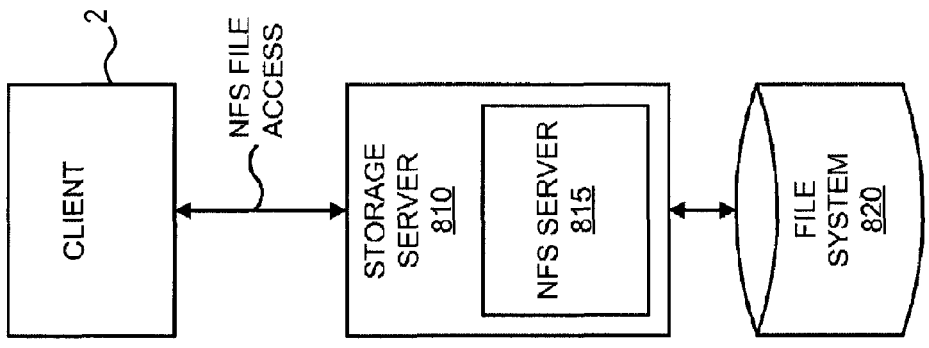
FIG. 11A shows a communications configuration between a client apparatus and a file system according to an embodiment of the present invention.

FIGS. 11A, 11B, and 11C each show an exemplary communications configuration between the virtual machine 310 of the first server system 3a of FIG. 10 and a client apparatus 2. Referring to FIG. 11A, a client apparatus 2 uses Network File System (NFS) file access to communicate with the virtual machine 310 which is implemented as a storage server 810. Storage server 810 includes an NFS server 815 and is coupled to a file system 820. Referring to FIG. 11B, a client apparatus 2 uses Common Internet File System (CIFS) file access to communicate with the virtual machine 310 which is implemented as a storage server 830. The storage server 830 includes a CIFS server 835 and is coupled to a file system 840. Referring to FIG. 11C, a client apparatus 2 uses Hypertext Transfer Protocol (HTTP) file access to communicate with the virtual machine 310 which is implemented as a storage server 850. The storage server 850 includes an HTTP server 855 and is coupled to a file system 870.

Figure 12:
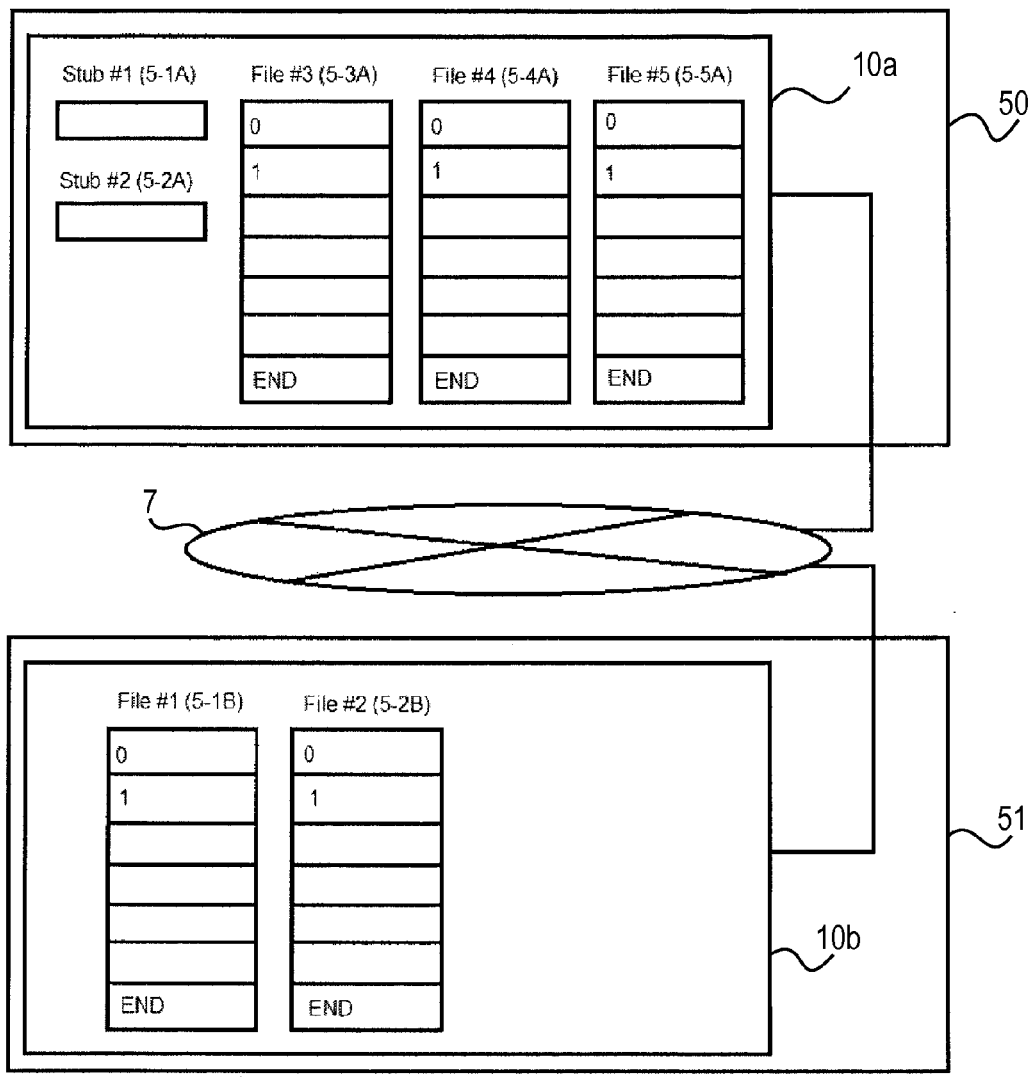
FIG. 12 shows a simplified block diagram of files stored on the first storage apparatus and the cloud storage according to an embodiment of the present invention.

FIG. 12 shows a simplified block diagram of the first storage apparatus 10a, which is the high tier storage area, that is available to the one or more client apparatuses, and the second storage apparatus of the cloud storage 51, which is utilized as the lower tier storage area. The first storage apparatus 10a retrieves data from the second storage apparatus 10b of the cloud storage 51 over the network 7 via a suitable protocol such as Hypertext Transfer Protocol Secure (HTTPS). By using a secure protocol, the security of data in transit from the cloud can be greatly enhanced if not completely assured. Alternatively, the client apparatuses 1 and 2, the first storage apparatus 10a and the cloud storage 51 may be connected over a single network (e.g., the Internet).

As files lose their immediate usefulness to a user, it is possible to free up valuable high tier storage capacity in the first storage apparatus 10a by moving older and/or lesser-used files from the high tier storage area to cloud storage. To free up storage space, a stub file is maintained in place of the actual file on the first storage apparatus 10a, and the actual file is moved to the cloud storage 51. Once the file(s) have been moved to the cloud storage 51, they are deleted from the first storage apparatus 10a, thus freeing valuable high tier storage capacity. While these files now exist on the cloud storage 51, the file system in which the files existed on the first storage apparatus 10a maintains a stub file for each of the files to provide the first storage apparatus 10a with the necessary information to recall the corresponding actual file from the cloud storage 51.

The stub file has the metadata of a file stored in the first storage apparatus 10a, but the actual file data is kept only in the second storage apparatus 10b and not managed by the first storage apparatus 10a. When the first server system 3a receives a request that is directed to the actual file data corresponding to a stubbed file, the actual file data needs to be transmitted from the cloud storage 51 to the first storage apparatus 10a so that the actual file data can be provided to the requesting client apparatus. The stub file appears to the client apparatuses as the actual file being stored on the first storage apparatus 10a, when in fact the data of the file has, in actuality, been moved to lower tier storage on the cloud storage 51.

Figure 17:
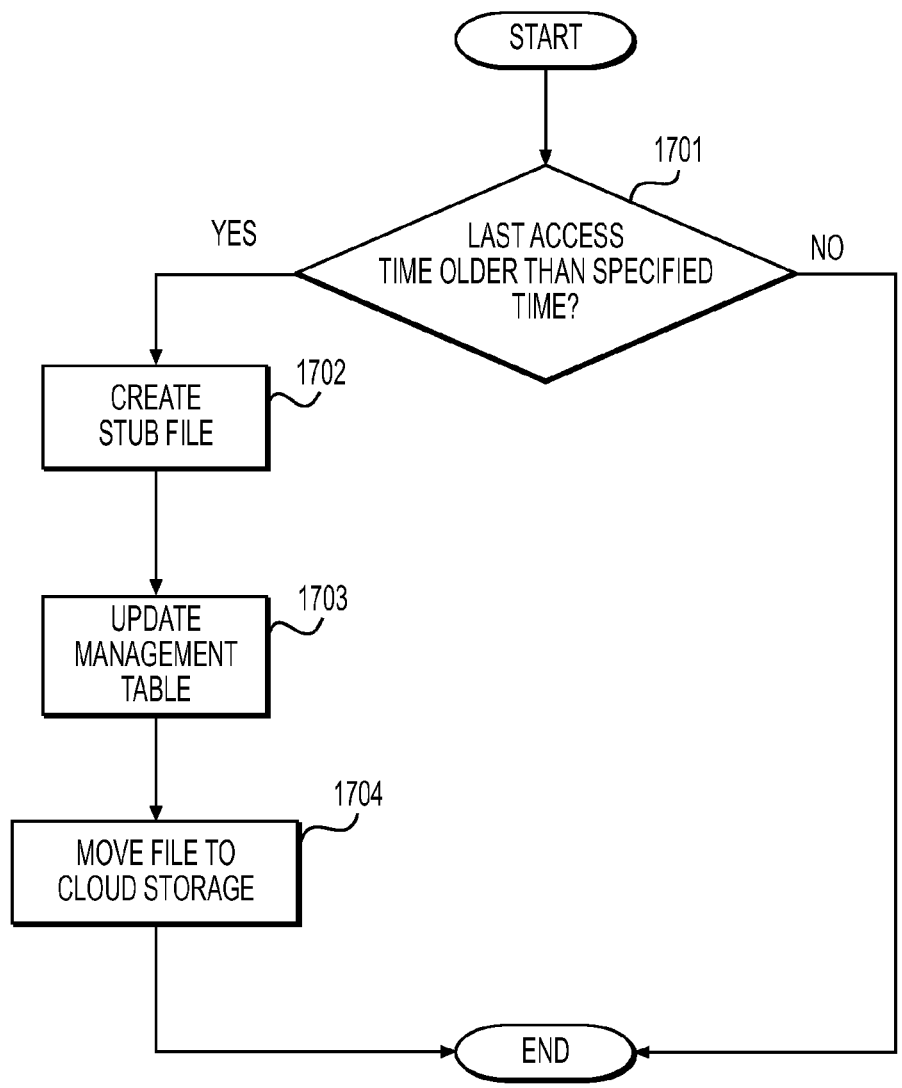
FIG. 17 shows an exemplary processing flow for migrating a file to the cloud storage according to an embodiment of the present invention.

As shown in FIG. 12, File #1 (5-1B), which is a file used in conjunction with office productivity software, has moved to the cloud storage provided by the cloud storage 51 from the first storage apparatus 10A. Thus, while File #1 (5-1B) had been stored in the high tier storage area, File #1 (5-1B) is now stored in the lower tier storage area. Accordingly, the first storage apparatus 10A maintains a stub file (5-1A) of File #1 (5-1B). The stub file #1 (5-1A) of File #1 (5-1B) contains metadata pertaining to File #1 (5-1B). The metadata in each of the stub files specifies, for example, the file size of the corresponding file stored on the cloud. The metadata of the stub file may also include the type of file which corresponds with the stub file. It is preferable that the stub file specifies the file size so that the first storage apparatus 10A can determine the data range of the file stored on the cloud. Similarly, in FIG. 12, File #2 (5-2B) in cloud storage 51 has also been moved from first storage apparatus 10A, and the first storage apparatus 10A maintains a corresponding stub file #2 (5-2A) of File #2 (5-2B). The stub files should be preferably sized accordingly so that individual stub files may be stored in the minimum storage unit of the high tier storage. Since stub files should preferably be the minimum storage unit of the high tier storage area, migrating large, unused files to the cloud can free significant amounts of high tier storage as the corresponding stub file will only occupy the smallest storage unit used by the high tier storage area. On the other hand, File #N (5-NA) represents one or more files which are stored in their entirety on the first storage apparatus 10A and the cloud storage 51 maintains no data relating to File #N (5-NA). The processing flow for migrating files to the cloud storage 51 is shown in FIG. 17 and will be described later.

FIG. 13 shows a management table maintained in the shared memory 15 of the first storage apparatus 10a (e.g., the first storage apparatus 10a). In the management table, there is stored file stub information indicating whether the file is a stub file or an actual file, file type information indicating the file type of the actual file, the file location information, access time information indicating the last date and/or time the file was accessed on the first storage apparatus 10a, size information indicating the size of the actual file, and migration information indicating the state of migration from the first storage apparatus 10a to the cloud storage 51 if applicable. While FIG. 13 shows this data managed in management table 8113, this data may also be managed in the replication information management table 331 and/or file access log 335 of the first server system 3a.

Further, FIG. 12 shows a simplified view of the first storage apparatus 10a. While the high tier storage provided at the edge 50 is shown to include a single first storage apparatus 10a, a plurality of first storage apparatuses 10a may exist at the edge 50. In FIG. 12, the first storage apparatus 10a is depicted as a single unit for simplicity. The first storage apparatus 10a is controlled by the processor board 12 which processes the I/O requests from hosts via a respective interface which is coupled to the local network 101. It should be apparent to one skilled in the art that the processor boards 12 may be implemented by various hardware and software configurations which include one or more processors and the shared memory 15. The processor boards 12 further communicate with the cloud storage 51 via the channel boards 11 which is coupled to the network 102. In FIG. 12, the storage device 17 of the first storage apparatus 17 contains stub files (5-1A and 5-2A) of File #1 (5-1B) and File #2 (5-2B), respectively, while also storing the entirety of File #3 (5-3A), File #4 (5-4A), and File #5 (5-5A). Since Files #3, #4 and #5 are stored in their entirety on the first storage apparatus 10a, there is preferably no data corresponding to Files #3, #4 and #5 on the cloud storage 51 since Files #3, #4 and #5 are actually stored on the first storage apparatus 10a at the edge 50. As shown in FIG. 8, the storage apparatus 10a stores an access pattern database 8114 storing the access patterns of applications for different file types in the shared memory 15. The access pattern database 8114 is referred to on a file-type basis when a file stored on the cloud storage 51 is requested by one of the client apparatuses.

Figure 14:
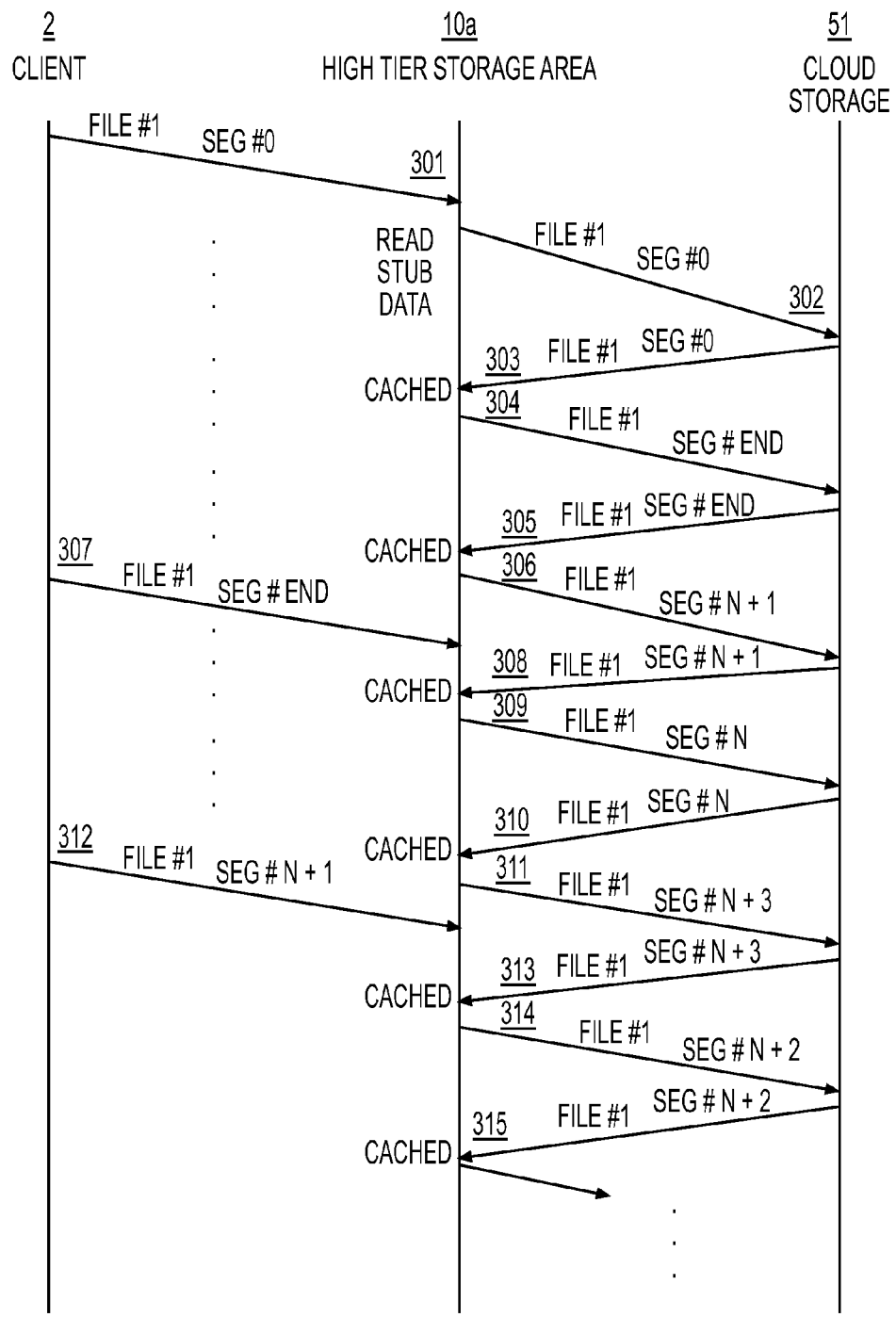
FIG. 14 shows a communications flow between the client, the high tier storage area and the cloud storage area when retrieving a file from the cloud storage area according to an embodiment of the present invention.

In addition, the cache memory 14 is provided in the first storage apparatus 10a for caching data, particularly data received from the cloud storage 51. FIG. 14 shows a communications flow when the client apparatus 2 requests data of File #1 (5-1B) from the first storage apparatus 10a. As shown in FIG. 12, when File #1 (5-1B) has been relocated from the first storage apparatus 10a to the cloud storage 51, only a stub file (5-1A) of File #1 (5-1B) remains on the first storage apparatus 10a. As a result, the first storage apparatus 10a must retrieve the requested data from the cloud storage 51. While not shown in FIG. 12, a plurality of client apparatuses 2 may communicate with the first storage apparatus 10a to request data instead of a single client apparatus 2, but to avoid being redundant the following description is made with reference to a single client apparatus 2 only.

In FIG. 14, the client apparatus 2, running one or more applications thereon, requests data of File #1 (5-1B). From the perspective of the client apparatus 1, the File #1 (5-1B) resides on the first storage apparatus 10a. It appears to the client apparatus 2 that File #1 (5-1B) is on the first storage apparatus 10a because the file system maintains the stub file 5-1A in place of the File #1 (5-1B). Specifically, the client apparatus 2 requests data from the File #1 (5-1B) in data ranges called segments. As shown in FIG. 14, the client apparatus 2 makes a request 301 for segment #0 (i.e. the first segment) of File #1 (5-1B) from the first storage apparatus 10a. The first storage apparatus 10a refers to the stub file 5-1A corresponding to File #1 (5-1B) to determine from the metadata the size of File #1 (5-1B). In addition, the first storage apparatus 10a must determine from the request to File #1 (5-1B) or the metadata in the stub file, the file type of File #1 (5-1B). By determining the file size and the file type, the first storage apparatus 10a is able to anticipate additional data segment requests from the client apparatus 2 for File #1 (5-1B). Namely, the first storage apparatus 10a determines the file type of the requested file and refers to the access pattern database 8114 to determine a predicted access pattern of data segment requests from client apparatus 2 for File #1 (5-1B). FIG. 15 shows an exemplary access pattern showing the relationship between the requests and corresponding non-sequential data segments and will be described later in more detail.

In response to the Client apparatus 2 requesting segment #0 of File #1 (5-1B) from the first storage apparatus 10a, the first storage apparatus 10a in turn makes a request 302 to the cloud storage 51 for segment #0 of File #1 (5-1B). For example, the first storage apparatus 10a makes the request using the HTTPS protocol segment #0 of File #1 (5-1B). The cloud returns a response 303 with segment #0 to the first storage apparatus 10a, and the first storage apparatus 10a places segment #0 into the cache memory 14. By knowing the file size of File #1 (5-1B) by referring to the stub file 5-1A corresponding to File #1 (5-1B) and the file type of File #1 (5-1B), the first storage apparatus 10a can make additional requests to the cloud storage 51 for additional segments of File #1 (5-1B) before the client apparatus 2 actually requests the additional segments from the first storage apparatus 10a.

For example, in FIG. 14, after receiving segment #0 from the cloud storage 51, the first storage apparatus 10a makes a request 304 for segment #end (e.g., the last segment) of File #1 (5-1B). The cloud returns a response 305 with segment #end to the first storage apparatus 10a, and the first storage apparatus 10a places segment #end into the cache memory 14. Thus, after requesting the first segment of File #1 (5-1B) from the cloud storage 51, the first storage apparatus 10a non-sequentially skips to the last segment of File #1 (5-1B) by requesting the last segment. The first storage apparatus 10a then makes additional non-sequential requests for data to the cloud storage 51. As shown in FIG. 14, the first storage apparatus 10a then begins to request intermediate data segments of File #1 (5-1B). For example, the first storage apparatus 10a makes a request 306 for segment #N+1 which is an intermediate data segment, where N is specified according to file type by the access pattern database 8114. The cloud storage 51 returns a response 308 with segment #N+1 to the first storage apparatus 10a, and the first storage apparatus 10a places segment #N+1 into the cache memory 14. The first storage apparatus 10a then makes a request 309 for segment #N, and the cloud storage 51 returns a response 310 with segment #N which is cached by the first storage apparatus 10a. The first storage apparatus 10a then makes a request 311 for segment #N+3, and the cloud storage 51 returns a response 313 with segment #N+3 which is cached by the first storage apparatus 10a. The first storage apparatus 10a then makes a request 314 for segment #N+2, and the cloud storage 51 returns a response 315 with segment #N+2 which is cached by the first storage apparatus 10a. Accordingly, the first storage apparatus 10a may perform interleaving when requesting intermediate segments of a file from the cloud storage 51.

As shown in FIG. 14, the first storage apparatus 10a makes interleaving requests 304, 306, 309, 311 and 314 for intermediate portions of the File #1 (5-1B). However, the communications flow in FIG. 14 is only one example of an access pattern for a particular file type. Other file types may correspond to different access patterns which may or may not specify interleaving of intermediate segments of data. The particular pattern of segment requests for a given file will be determined according to the predicted access pattern which is specific to that particular file type. Thus, for any file type which is associated with a non-sequential pattern of access, the particular access pattern should be stored in the access pattern database 8114 in advance.

While the client apparatus 2 makes an initial request 301 for segment #0 to the first storage apparatus 10a, the first storage apparatus 10a recognizes that the type of file associated with the request has a non-sequential access pattern and begins retrieving additional segments in advance from the cloud storage 51. It is preferable that the additional segments be read in advance from the cloud storage 51 before the client apparatus 2 makes additional requests 307 and 312 to the first storage apparatus 10a so that the requested file (e.g., File #1 (5-1B)) appears to the client apparatus 2 to be stored in the first storage apparatus 10a, although the first storage apparatus 10a only actually stores a stub file. Otherwise, latencies in retrieving data segments from the cloud storage 51 which have already been requested from the client apparatus 2 may become apparent to the client apparatus 2 since the file takes longer than expected to be retrieved from the first storage apparatus 10a. Thus, it is preferable to retrieve data segments from the cloud storage 51 according to the specified non-sequential access pattern prior to the client apparatus 2 actually requesting these data segments from the first storage apparatus 10a.

In FIG. 14, at some point in time after the client apparatus 2 makes a request 301 for segment #0 from the first storage apparatus 10a the client apparatus 2 will make a subsequent request for another data segment. In the communications flow of FIG. 14, the client apparatus 2 makes a request 307 for segment #end from the first storage apparatus 10a. Since the first storage apparatus 10a has followed the non-sequential access pattern of the file type the client apparatus 2 is requesting, segment #end has already been retrieved by the first storage apparatus 10a from the cloud storage 51 and placed in the cache memory 14 of the first storage apparatus 10a prior to the first storage apparatus 10a receiving the request 307 for segment #end from the client apparatus 1. As a result, the first storage apparatus 10a is able to fulfill the request 307 by client apparatus 2 for segment #end by referring to the cache memory 14. Similarly, at some later point in time after the request 307, the first storage apparatus 10a can expect a request 312 for intermediate segment #N+1 as specified by the non-sequential access pattern database. Since the first storage apparatus 10a has already retrieved (by request 306 and response 308) segment #N+1 from the cloud storage 51, the first storage apparatus 10a can fulfill the request 312 from the client apparatus 2 by reading segment #N+1 from the cache memory 14. While not shown in FIG. 14, additional requests from the client apparatus 2 for further data segments matching the non-sequential access pattern specified by the non-sequential access pattern database 8114 can be expected by the first storage apparatus 10a. As such, the first storage apparatus 10a should be expected to continue to request data segments from the cloud storage 51, as needed, according to the non-sequential access pattern of the particular file.

As a result of making non-sequential requests for data segments according to the non-sequential access pattern, data segments can be read ahead in advance of the requests by the client apparatus 2 from the cloud storage 51 and stored in the cache memory 14 of the first storage apparatus 10a. Further, by fulfilling requests from the client apparatus 2 by referring to the cache memory 14, it can appear from the view of the client apparatus 2 that the requested data segments are actually stored on and provided by the first storage apparatus 10a when, in reality, the requested data segments are stored in a lower tier storage area on the cloud storage 51. As such, high tier storage capacity can be efficiently used on the first storage apparatus 10a while the client apparatus 2 will perceive that certain files (e.g., stub files such as File #1 (5-1B)) are still stored on the first storage apparatus 10a when they have been moved, in fact, to lower tier storage on the cloud storage 51 to make efficient use of the existence of the high and lower tier storage areas.

The foregoing communications flow can be modified in an alternative embodiment as follows. In the communications flow of FIG. 14, it is assumed that each file on the cloud storage 51 is retrieved by a number of requests directed to individual segments. However, in an alternative embodiment, only files which are larger than a predetermined size are retrieved from the cloud storage 51 in segments. Specifically, in the alternative embodiment, any files which are smaller than the predetermined size are retrieved from the cloud storage 51 by a single request directed to the entire file data range. Thus, in the alternative embodiment, small files can be retrieved from the cloud storage in one request provided that the file size does not exceed the maximum data range supported by the underlying transfer protocol. For example, if a given file is capable of being retrieved from the cloud storage 51 in a single HTTPS session, then the first storage apparatus 10a will retrieve the file in a single HTTPS session since the file size does not exceed the size limit supported for the single HTTPS session. Meanwhile, for files which exceed the size limit capable of being transferred in a single HTTPS session, the first storage apparatus will retrieve such files according to the communications flow shown in FIG. 14, for example. As a result of the foregoing modification to the communications flow in FIG. 14, smaller files may be more efficiently retrieved from the cloud storage 51 by transferring the smaller files as a whole in a single transfer session between the first storage apparatus 10a of the edge 50 and the cloud storage 51.

FIG. 15 shows an exemplary access pattern of a presentation or slideshow application file type where segments of data are accessed non-sequentially and retrieved from the cloud storage provided by the cloud storage 51. The first request from the client apparatus 2 is to segment #0 (e.g., the first data segment of the file). The second and third requests from the client apparatus are also directed to segment #0. The fourth request is to segment #end (e.g., the last data segment of the file). The fifth request is to segment #0, the sixth request is to segment #2, the seventh request is to segment #3, and the eighth request is to segment #1. After the eighth request, the client apparatus begins requesting data segments in an interleaving manner as shown in FIG. 15. Specifically, the ninth and a predetermined number of additional requests are requested in an interleaving manner where 'N' is determined according to the file type.

For the access pattern shown in FIG. 15, if the requests were directed to a file which was stored on the cloud storage 51, the first storage apparatus 10a would preferably retrieve segment #0 and make subsequent requests to the cloud storage 51 according to the access pattern database 8114. Thus, any repeated requests for segment #0, which follow the first request for segment #0, should preferably be fulfilled by the first storage apparatus 10a by referring to the cache memory 14 since segment #0 should be placed in the cache memory 14 after being received from the cloud storage 51. Likewise, the fourth request to segment #end would preferably have been retrieved from the cloud storage 51 in advance by the first storage apparatus 10a according to the non-sequential access pattern specified by the access pattern database 8114. Furthermore, it is preferable that at least the interleaving requests (e.g., request #9 and so on) are also retrieved in advance by the first storage apparatus 10a according to the non-sequential access pattern specified by the access pattern database 8114. As a result, the requests from the client apparatus 2 can be fulfilled by the first storage apparatus 10a by referring to the cache memory 14 instead of waiting to receive a request from the client apparatus 2 and forwarding the request to the cloud storage 51. Thus, efficient storage of files in the cloud storage 51 can be realized while making it appear to the client apparatus 2 that such files are stored on the high tier storage area corresponding to the first storage apparatus 10a.

When the access pattern database 8114 specifies that the client apparatus will make interleaving requests for data segments in FIG. 15, the first storage apparatus 10a in turn makes interleaving retrievals from the cloud storage 51. For example, the first storage apparatus 10a first retrieves segment #N+1 then segment #N and so forth as shown in FIG. 15.

However, the first storage apparatus 10a may handle interleaved requests in another alternative embodiment as follows. Instead of making two retrievals from the cloud storage 51 for each of segments #N+1 and N, which requires two separate HTTPS sessions to be set up between the first storage apparatus 10a and the cloud storage 51, the first storage apparatus 10a may retrieve segments #N and #N+1 as a contiguous data range. As a result, retrieving the two segments in a single HTTPS session can cut down on the latency in receiving both segments from the cloud storage 51. In addition, retrieving segments #N and #N+1 as a contiguous data range can also reduce the cost of accessing the cloud storage 51 since one HTTPS session is established between the first storage apparatus 10a and the cloud storage 51 rather than two separate HTTPS sessions which may result in two access charges from the cloud provider in the case where cloud storage is billed on a per-access basis.

In the communications flow shown in FIG. 14, the requests from the client apparatus 2 may be sized as 32 k segments, for example. Thus, based on the pattern of access in FIG. 14, if two interleaved segments were combined into a single HTTPS request, the requested range would be to a contiguous 64 k segment of data. However, the size of the data range retrieved per HTTPS session may vary and one skilled in the art should appreciate that the specific size of the data range requested per HTTPS session should be chosen to avoid session timeouts and other such problems which would contribute to latencies in providing the requested file segments to the client apparatus.

Further, each of the segments #N and #N+1 should preferably be placed in the cache memory 14 prior to the client apparatus requesting these segments from the first storage apparatus 10a. In addition, the size of segments #N and #N+1 must be taken into consideration because if the size becomes too large, the single HTTPS session may time out causing undesirably long wait times at the client apparatus for the requested data. As such, handling interleaved portions of the access pattern as single requests which are larger in size may cut down on the number of HTTPS sessions needed between the first storage apparatus 10a and the cloud storage 51 as long as the size of the requested data is carefully selected so as to not increase the client apparatus's wait time for requests to the first storage apparatus 10a to be fulfilled.

Furthermore, the first storage apparatus 10a may handle fulfilling interleaved requests as follows in yet another alternative embodiment. For some files or file types, it may be difficult to specify when interleaving requests will begin and/ or when the interleaving requests will stop. To overcome the difficulty in predicting when the client apparatus will begin handling interleaving requests, the first storage apparatus 10a may begin making interleaving data retrievals from the cloud storage 51 after the client apparatus has made a predetermined number of interleaving requests to the first storage apparatus 10a.

While small files stored on the cloud storage 51 may be able to be cached in their entirety without exceeding the memory limit of the cache memory 14, when a client apparatus requests larger files, it is preferable that the data segments in the cache memory 14 be efficiently maintained. For example, only segments which are most likely to be requested by the client apparatus more than once or have been most recently placed in the cache memory 14 are held in the cache memory 14 after they have been read out and transmitted to the client apparatus 1. Thus, for the access pattern shown in FIG. 15, segment #0 and segment #end would preferably be held in the cache memory 14 even after they are provided by the first storage apparatus 10a. For example, segment #0 and segment #end may be held in the cache memory 14 until the client apparatus has finished making requests for the file. In some instances, it may be more preferable to hold onto larger portions of the front of the file in the cache memory 14 than just segment #0 (e.g., it may be preferable to also maintain segments #1 through M, where M is an integer) until the client apparatus has finished requesting the file. In FIG. 15, the interleaved data segments may not be requested by the client apparatus more than once, as specified by the access pattern database, and should only be held in the cache memory 14 in order of most recently received in order to avoid overflowing the cache memory 14 with unnecessary data.

Figure 16:
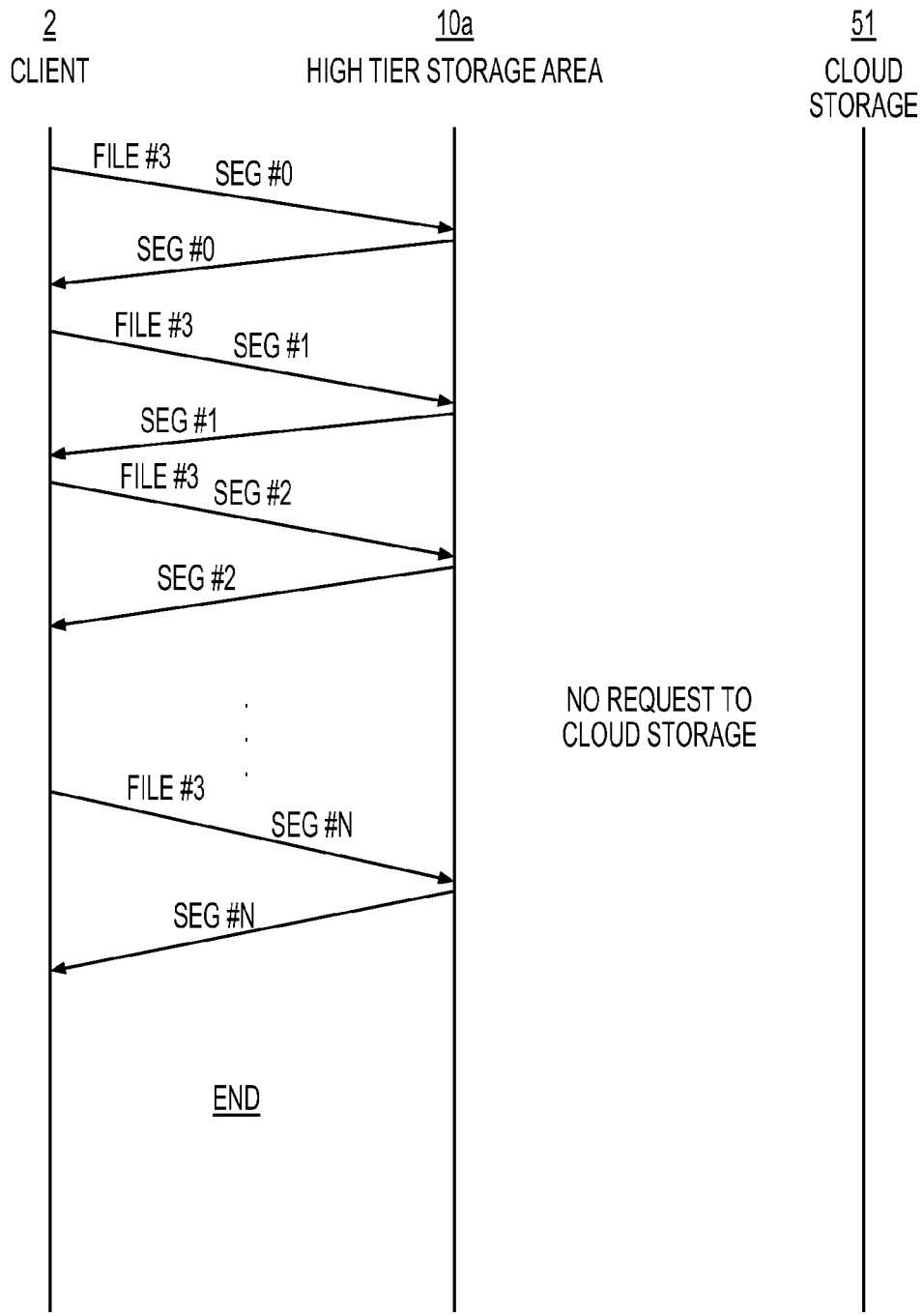
FIG. 16 shows a communications flow between the client, the high tier storage area and the cloud storage area when requesting a locally stored file according to an embodiment of the present invention.

FIG. 16 shows an exemplary access pattern to a file, such as File #3, which is stored on the first storage apparatus 10a and no retrieval from the cloud storage 51 is necessary. In FIG. 16, the file is of a file type where segments of data are accessed sequentially. Since the entirety of File #3 is stored on the first storage apparatus 10a, it is unnecessary to make any access requests to the cloud storage 51. Thus, each of the requests from the client apparatus 2 can be fulfilled directly by the first storage apparatus 10a without needing to refer to a stub file or the access pattern database 8114. As shown in FIG. 16, the client apparatus 2 first requests segment #0 of File #3 from the first storage apparatus 10a. The first storage apparatus 10a provides the client apparatus 2 with segment #0 without referring to the cloud storage 51. Likewise, each of segments #1 through #N are requested by the client apparatus #1 and provided by the first storage apparatus 10a without needing to refer to the cloud storage 51 since File #3 is stored locally on the first storage apparatus 10a.

FIG. 17 shows an exemplary processing flow for migrating a file to the cloud storage according to an embodiment of the present invention. First, at step 1701, it is determined for a given file whether the last access time of the file is older than a specified file management time. The specified file management time serves to indicate how long files should be stored in the high tier storage area before being transferred to the cloud storage 51. If the last access time of the file is older than the specified file management time, a stub file corresponding to the file is created at step 1702. Next, the management table 8113 is updated to reflect the stub file being created at step 1703. Then, the file is moved to the cloud storage 51 and the management table 8113 is updated to reflect the file moving to the cloud storage 51 at step 1704.

Figure 18:
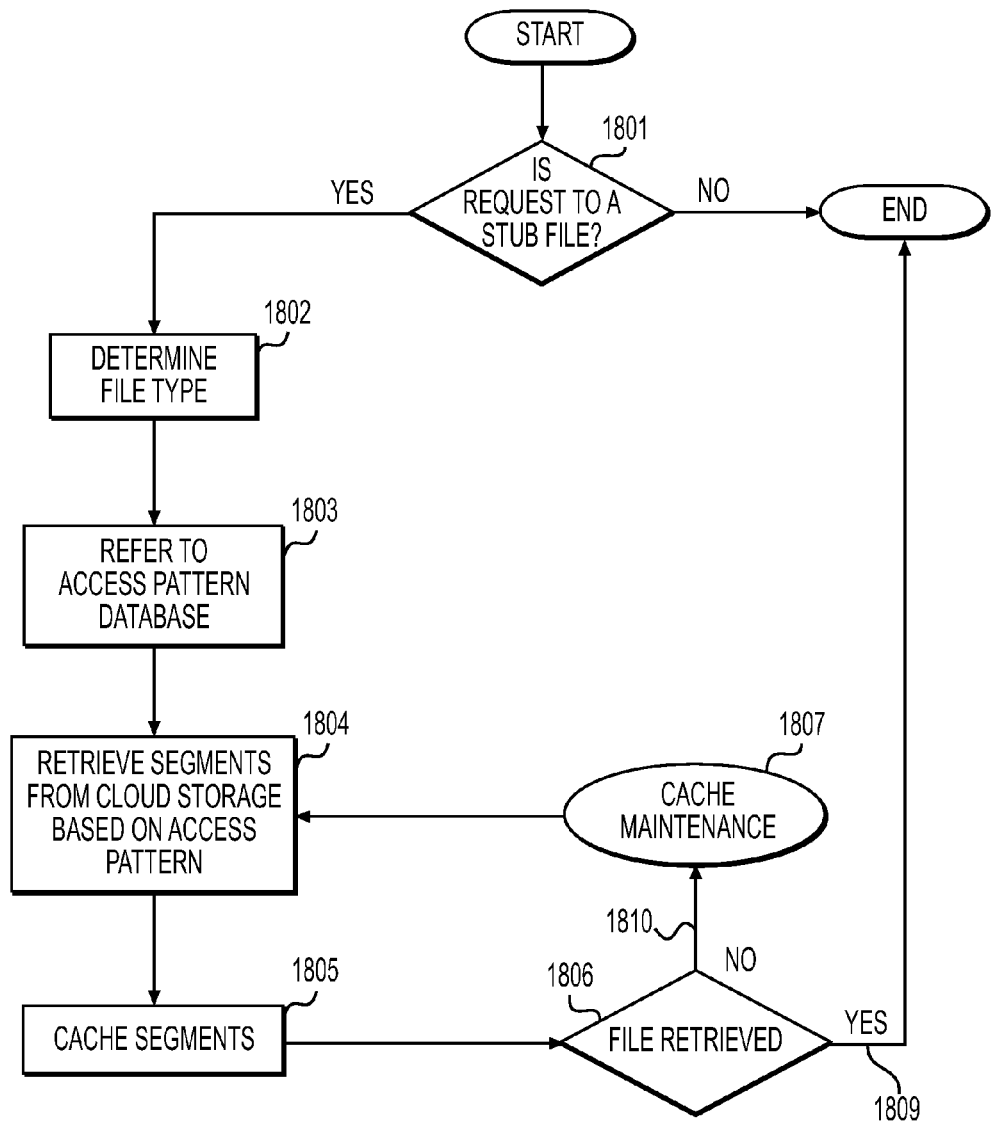
FIG. 18 shows an exemplary processing flow for retrieving a file from the cloud storage according to an embodiment of the present invention.

FIG. 18 shows an exemplary processing flow for retrieving a file from the cloud storage according to an embodiment of the present invention, and FIG. 14 shows an exemplary communications flow according to the processing flow in FIG. 18 . . . First at step 1801, it is determined whether a client apparatus 2 has requested data of a file which is a stub file on the first storage apparatus 10a and which is actually stored on the cloud storage 51. If the request is not to a stub file (NO at step 1801), the retrieval is for a file stored locally at the edge 50 and the processing flow ends. If the request is to a stub file (YES at step 1801), the first storage apparatus 10a determines the type of file being requested at step 1802. Then, the first storage apparatus refers to the access pattern database at step 1803 to determine the access pattern for retrieving file segments from the cloud storage 51. At step 1804, the first storage apparatus retrieves segments from the cloud storage 51 based on the access pattern corresponding to the file type being requested by the client apparatus 2. Data segments retrieved from the cloud storage 51 are stored in the cache memory 14 at step 1805. At step 1806, it is determined whether all of the file has been retrieved from the cloud storage 51. If all of the file has not been retrieved (step 1810), cache maintenance is performed at step 1807 and additional segments of the file are retrieved from the cloud storage 1804. If all of the segments of the file have been retrieved, the processing flow for retrieving the file from the cloud storage ends at step 1809.

Figure 19:
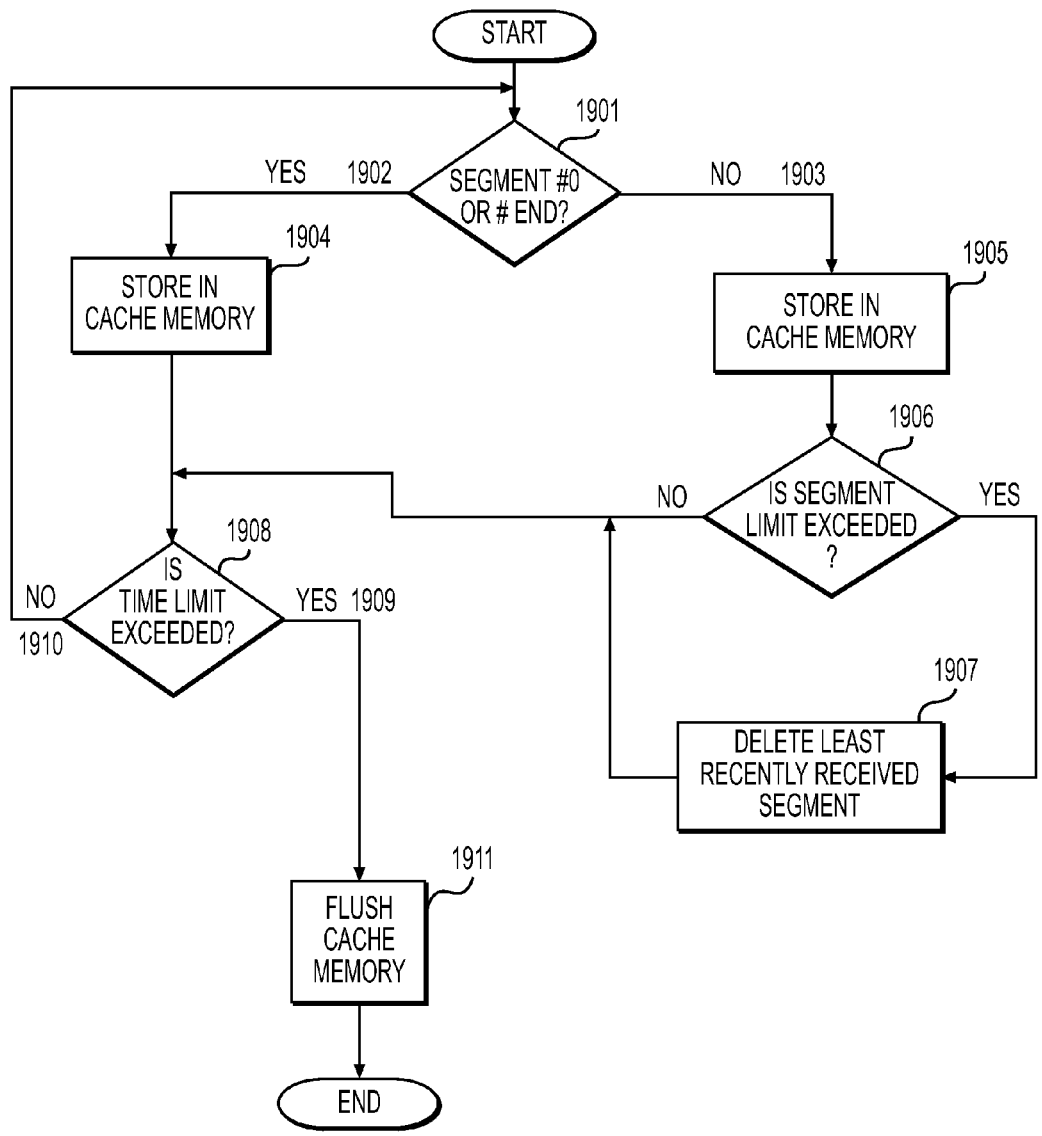
FIG. 19 shows an exemplary processing flow for cache maintenance according to an embodiment of the present invention.

FIG. 19 shows an exemplary processing flow for cache memory maintenance according to an embodiment of the present invention. When a segment is received by the first storage apparatus 10a from the cloud storage 51, it is determined whether the received segment is #0 or #END at step 1901. If Yes (step 1902), then the received segment is stored in the cache memory 14 at step 1904. If No (step 1903), the segment is stored in the cache memory 14 at step 1905 and it is determined whether the size of the segments stored in the cache memory 14 exceeds a predetermined size limit at step 1906. If the size limit is exceeded (Yes), the least recently received segment other than #0 and #END is deleted from the cache memory 14 at step 1907. It is then determined if a predetermined time limit for storing the segments is exceeded at step 1908. If the size limit is not exceeded, processing proceeds directly to step 1908. If the time limit is not exceeded at step 1910, the first storage apparatus proceeds to retrieve data segments according to the access pattern as shown in FIGS. 14 and 18, for example. If the time limit is exceeded at step 1909, the cache memory 14 is flushed of all segments of the file to clear the cache memory 14 at step 1911 and processing ends. Alternatively, the cache can be maintained so that data segments are held on a first in, first out (FIFO) basis.

FIG. 20 shows an exemplary access pattern of a spreadsheet application file type where segments of data are accessed non-sequentially and retrieved from the cloud storage provided by the cloud storage 51. In FIG. 20, the first segment (e.g., segment #0) is repeatedly requested, then a request is made for the last segment (e.g., segment # END) prior to requesting the first through last segments. At the end of the access pattern in FIG. 20, the first segment is requested twice before the last segment is again requested.

Figure 21:
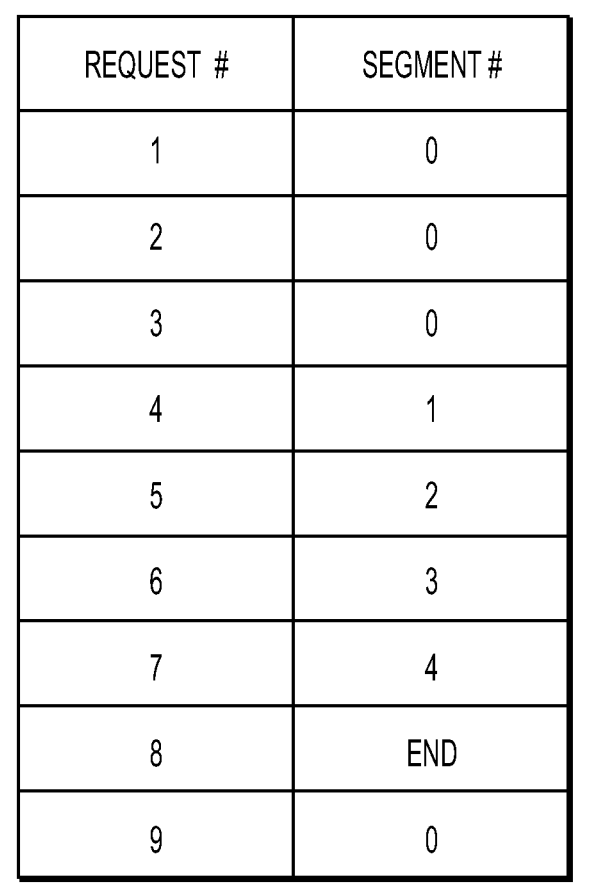

FIG. 21 shows an exemplary access pattern of a word processing application file type where segments of data are accessed non-sequentially and retrieved from the cloud storage provided by the cloud storage 51. In FIG. 21, requests to the first segment (e.g., segment #0) are repeated prior to requesting the second through last segments. At the end of the access pattern in FIG. 21, the last request is directed to the first segment.

While FIGS. 20 and 21 show access patterns related to word processing and spreadsheet file types, the respective access patterns can vary depending on the particular size of the file being requested. In general, logging the requests to a specifically-sized file type will allow one of skill in the art to determine the differences in access patterns of files of the same type which have varying sizes.

Other embodiments and uses of the above inventions will be apparent to those having ordinary skill in the art upon consideration of the specification and practice of the invention disclosed herein. The specification and examples given should be considered as examples only, and it is contemplated that the appended claims will cover any and all other such embodiments, modifications and equivalents which fall within the spirit and scope of the invention.

What is claimed is:

1. A computer system connected over a network to a cloud service, the computer system comprising:
 a storage area connected to another computer, and having a file system which includes a stub file representing a file stored with the cloud service; and
 a cache and a processor connected to the storage area,
 wherein the file is a logical sequence of plural data segments,
 wherein an initial request for a first data segment of the file from the another computer to the storage area causes the processor to refer to the stub file, issue a first request to the cloud service for the first data segment of the file stored with the cloud service, and store the first data segment of the file in the cache,
 wherein, based on the initial request to the file, the processor issues a second request to the cloud service for a last data segment of the file stored with the cloud service, and stores the last data segment of the file in the cache, and,
 wherein, after the second request for the last data segment, the processor issues one or more additional requests to the cloud service for non-sequential intermediate data segments from among an intermediate logical sequence of the data segments of the file stored with the cloud service based on a type of the file, and stores the non-sequential intermediate data segments in the cache,
 wherein the non-sequential intermediate data segments are non-sequential within the intermediate logical sequence which includes the data segments of the file other than the first data segment and the last data segment of the file, and
 wherein the one or more additional requests to the cloud service are independent of any additional requests from the another computer after the initial request.

2. The computer system of claim 1, wherein any additional requests, after the initial request, for non-sequential data segments of the file from the another computer to the storage area, causes the processor to refer to the cache, and read the non-sequential data segments from the cache corresponding to the additional requests from the another computer.

3. The computer system of claim 1, wherein the one or more additional requests are issued from the processor after the last data segment of the file is stored in the cache.

4. The computer system of claim 1, wherein the non-sequential intermediate data segments are interleaved data segments.

5. The computer system of claim 1, wherein the non-sequential intermediate data segments are 64 k segments.

6. The computer system of claim 1, wherein the stub file includes metadata indicating the type of the file stored with the cloud service.

7. The computer system of claim 1, wherein the file system is CIFS.

8. The computer system of claim 1, wherein the first, second and additional requests to the cloud service are HTTPS requests.

9. The computer system of claim 1, wherein the another computer reads the first, last and non-sequential intermediate data segments from the cache.

10. The computer system of claim 1, wherein the non-sequential intermediate data segments are removed on a FIFO basis from the cache.

11. The computer system of claim 1, wherein the non-sequential intermediate data segments are removed on a least recently accessed basis from the cache.

12. A method of retrieving a file, the method comprising:
    storing a file with a cloud service and maintaining a stub file representing the file on a file system of a storage area connected over a network with the cloud service, where the file is a logical sequence of plural data segments;
    receiving at the storage area an initial request for a first data segment of the file from another computer connected to the storage area;
    referring to the stub file;
    issuing a first request from the storage area to the cloud service for the first data segment of the file stored with the cloud service;
    storing the first data segment of the file in a cache accessible to the storage area;
    issuing, based on the initial request, a second request from the storage area to the cloud service for a last data segment of the file stored with the cloud service;
    storing the last data segment of the file in the cache;
    issuing, based on a type of the file, one or more additional requests from the storage area to the cloud service for non-sequential intermediate data segments from among an intermediate logical sequence of the data segments of the file stored with the cloud service based on a type of the file; and
    storing the non-sequential intermediate data segments in the cache,
    wherein the non-sequential intermediate data segments are non-sequential within the intermediate logical sequence which includes the data segments of the file other than the first data segment and the last data segment of the file, and
    wherein the one or more additional requests to the cloud service are independent of any additional requests from the another computer after the initial request.

13. The method of claim 12, further comprising:
    receiving, at the storage area and after the initial request, the additional requests from the another computer for the non-sequential data segments of the file; and
    reading the non-sequential data segments from the cache corresponding to the additional requests from the another computer.

14. The method of claim 12, wherein the one or more additional requests are issued from the storage area after the last data segment of the file is stored in the cache.

15. The method of claim 12, wherein the non-sequential intermediate data segments are interleaved data segments.

16. The method of claim 12, wherein the non-sequential intermediate data segments are 64 k segments.

17. The method of claim 12, wherein the stub file includes metadata indicating the type of the file stored with the cloud service.

18. The method of claim 12, wherein the file system is CIFS.

19. The method of claim 12, wherein the first, second and additional requests to the cloud service are HTTPS requests.

20. The method of claim 12, wherein the another computer reads the first, last and non-sequential intermediate data segments from the cache.

21. The method of claim 12, further comprising:
    removing the non-sequential intermediate data segments on a FIFO basis from the cache.

22. The method of claim 12, further comprising:
    removing the non-sequential intermediate data segments on a least recently accessed basis from the cache.

* * * * *